US012757112B2

(12) United States Patent
Qi et al.

(10) Patent No.: US 12,757,112 B2
(45) Date of Patent: Oct. 6, 2026

(54) SYNCHRONIZATION SIGNAL BLOCK PATTERN ENHANCEMENT

(71) Applicant: Apple Inc., Cupertino, CA (US)

(72) Inventors: Yihong Qi, Santa Clara, CA (US); Amir Aminzadeh Gohari, Sunnyvale, CA (US); Amir Farajidana, Sunnyvale, CA (US); Dan Zhang, San Diego, CA (US); Herbert R. Dawid, Herzogenrath (DE); Idan Bar-Sade, Sunnyvale, CA (US); Keith W. Saints, San Diego, CA (US); Onurcan Iscan, Munich (DE); Ruoheng Liu, San Diego, CA (US); Sami M. Almalfouh, San Jose, CA (US); Sung Eun Lee, Sunnyvale, CA (US); Tudor Ninacs, Munich (DE); Wenshu Zhang, Sunnyvale, CA (US); Yuanye Wang, San Jose, CA (US)

(73) Assignee: Apple Inc., Cupertino, CA (US)

(*) Notice: Subject to any disclaimer, the term of this patent is extended or adjusted under 35 U.S.C. 154(b) by 374 days.

(21) Appl. No.: 18/371,994

(22) Filed: Sep. 22, 2023

(65) Prior Publication Data

US 2024/0107473 A1 Mar. 28, 2024

Related U.S. Application Data

(60) Provisional application No. 63/409,001, filed on Sep. 22, 2022.

(51) Int. Cl.
*H04W 56/00* (2009.01)
*H04J 11/00* (2006.01)
(Continued)

(52) U.S. Cl.
CPC ......... *H04W 48/20* (2013.01); *H04J 11/0069* (2013.01); *H04L 5/0048* (2013.01);
(Continued)

(58) Field of Classification Search
CPC ............... H04J 11/0069; H04J 11/0076; H04J 11/0073; H04L 5/0048; H04L 5/0053;
(Continued)

(56) References Cited

U.S. PATENT DOCUMENTS

2018/0376454 A1* 12/2018 Åström ............. H04W 72/0446
2019/0132170 A1* 5/2019 Si ......................... H04W 56/001
(Continued)

FOREIGN PATENT DOCUMENTS

CN 108064435 A 5/2018
CN 110383724 A * 10/2019 ............ H04J 13/102
(Continued)

*Primary Examiner* — Phong La
(74) *Attorney, Agent, or Firm* — Fish & Richardson P.C.

(57) ABSTRACT

A system is configured for reconfiguration of a Synchronization Signal Block (SSB) pattern. The system is configured for obtaining data including a configuration for a Synchronization Signal Block (SSB) transmission carrying a physical broadcast channel (PBCH), the configuration specifying, for an SSB of the configuration, resource elements (REs) allocated for transmitting a primary synchronization signal (PSS) to a user equipment (UE) and REs allocated for transmitting a secondary synchronization signal (SSS) to the UE. The system is configured for selecting a set of REs that are unused in the configuration for the SSB transmission, specifying a filling sequence for extending a synchronization signal or an SSB to the set of REs that are unused in the configuration of the SSB transmission, generating data including an enhanced configuration for the SSB transmission that includes the extended synchronization signal or the extended SSBs, and transmitting the SSB transmission using the enhanced configuration.

20 Claims, 15 Drawing Sheets

(51) Int. Cl.

| | |
|---|---|
| ***H04L 5/00*** | (2006.01) |
| ***H04W 48/20*** | (2009.01) |
| ***H04W 72/30*** | (2023.01) |

(52) U.S. Cl.
CPC ....... *H04W 56/0015* (2013.01); *H04W 72/30* (2023.01); *H04J 11/0073* (2013.01); *H04J 11/0076* (2013.01)

(58) Field of Classification Search
CPC .. H04W 72/30; H04W 48/20; H04W 56/0015
See application file for complete search history.

(56) References Cited

U.S. PATENT DOCUMENTS

| | | | | |
|---|---|---|---|---|
| 2019/0313428 | A1 | 10/2019 | Zhou et al. | |
| 2019/0394747 | A1 | 12/2019 | Akkarakaran et al. | |
| 2020/0015214 | A1* | 1/2020 | Si | H04W 56/0015 |
| 2021/0160117 | A1 | 5/2021 | Xiong et al. | |
| 2023/0239815 | A1* | 7/2023 | Paz | H04L 5/0053 370/503 |
| 2023/0379757 | A1* | 11/2023 | Mozaffari | H04W 56/001 |
| 2024/0107439 | A1 | 3/2024 | Qi et al. | |
| 2024/0107473 | A1* | 3/2024 | Qi | H04J 11/0069 |

FOREIGN PATENT DOCUMENTS

| | | | | | |
|---|---|---|---|---|---|
| CN | 108809570 | B | * | 4/2020 | H04L 5/0048 |
| EP | 2982179 | B1 | * | 9/2020 | H04W 48/10 |
| JP | 2020519141 | A | * | 6/2020 | H04J 13/0074 |
| WO | WO-2023209151 | A1 | * | 11/2023 | H04L 5/0094 |

* cited by examiner

SYNCHRONIZATION SIGNAL BLOCK PATTERN ENHANCEMENT

CLAIM OF PRIORITY

This application claims priority under 35 U.S.C. § 119(e) to U.S. Patent Application Ser. No. 63/409,001, filed on Sep. 22, 2022, the entire contents of which are hereby incorporated by reference.

BACKGROUND

Wireless communication networks provide integrated communication platforms and telecommunication services to wireless user devices. Example telecommunication services include telephony, data (e.g., voice, audio, and/or video data), messaging, internet-access, and/or other services. The wireless communication networks have wireless access nodes that exchange wireless signals with the wireless user devices using wireless network protocols, such as protocols described in various telecommunication standards promulgated by the Third Generation Partnership Project (3GPP). Example wireless communication networks include Long Term Evolution (LTE), and Fifth Generation New Radio (5G NR). A Synchronization Signal Block (SSB) is a synchronization block carrying the physical broadcast channel (PBCH). The SSB also includes synchronization signals that include a Primary Synchronization Signal (PSS) and a Secondary Synchronization Signal (SSS).

SUMMARY

This specification describes patterns of synchronization signal blocks (SSBs) for the Fifth Generation (5G) new radio (NR) networks. The SSBs are configured for transmitting the PSS and the SSS, and the physical broadcast channel (PBCH) in resource elements (REs). Each SSB includes a defined pattern for the transmission of the PSS, SSS and PBCH that includes master information blocks (MIBs). The pattern includes empty REs that is also called zero power REs. A resource element is the smallest unit of the resource grid made up of one subcarrier in frequency domain (e.g., 15 kHz subcarrier, 30 kHz subcarrier, etc.) and one Orthogonal Frequency Division Multiplexing (OFDM) symbol in time domain. For the sake of simplified description, a PRB is defined as 12 consecutive REs in frequency domain in this specification.

User equipment (UE) searches and processes SSBs to determine a timing and a frequency of a transmitted signal from a base station (e.g., gNB, node, etc.). The UE measures signal metrics such as a signal to noise ratio (SINR), Reference Signal Received Power (RSRP), and a Reference Signal Received Quality (RSRQ) based on the timing and the frequency of an SSB.

An SSB includes a Primary Synchronization Signal (PSS) symbol with a pseudo-random sequence related to a cell-ID-2. The SSB includes a Secondary Synchronization Signal (SSS) symbol with cell-ID-1 related pseudo-random sequence. The SSB includes symbols for the Physical Broadcast Channel (PBCH) that includes PBCH-demodulation reference signal (PBCH-DMRS). There are 3 symbols allocated for the PBCH. The SSB includes zero Resource Elements (RE). Zero resource elements are generally empty REs in the SSB. In an example, there are 113 zero REs around the PSS, and 17 zero REs around the SSS.

The UE uses the SSB for searching a cell. The PSS is correlated with received IQ samples to find a timing and a frequency of the SSB and the Cell ID2 (e.g., the group ID). The UE uses the SSS to find the Cell ID1, and a Physical Cell ID (PCID) value. The UE uses the PBCH-DMRS correlation to find the 3 Least Significant Bits (LSB) of the SSB index. The UE decodes the PBCH to find a cell timing, representing values for the SFN, a half-frame indication, and the 3 most significant bits (MSB) for the SSB index for FR2.

The SSB pattern can be changed to facilitate cell detection and measurement improvement by the UE. In low-SINR and coverage enhancement scenarios, the UE can search an expanded PSS, SSS, or both to improve each of cell detection and performance. As a contrast, NR SSB pattern is configured for scenarios in which the SINK is greater than −10 dB at the UE.

The base station can reconfigure the SSBs to expand the PSS, SSS, and/or PBCH to additional REs (e.g., the zero REs). In this manner, the base station can improve cell detection and measurement performance by the UE because it increases processing gain of SSB detection at UE. The base station can reconfigure the SSB pattern to expand the PSS/SSS/PBCH in one or more of the following ways. In an example, the base station configures the SSB by repeating existing synchronization signal (SS) REs/PRBs in the time domain (TD) and/or frequency domain (FD). The repetition of existing SS simplifies the UE reception process. In another example, the base station configures an updated SSB pattern by increasing the number of synchronization signal (SS) REs/PRBs and using new random sequences, as described herein.

When the base station expands or reuses the PSS, SSS, or SSB, the UE cannot rely only on expected NR SSB patterns for time and/or frequency synchronization, because the PSS/SSS/SSB patterns may be non-NR compliant. In a first scenario, the base station reuses PSS/SSS/SSB without consideration of backwards compatibility (e.g., with NR). In this scenario, extra requirements are preconfigured for the UE. For example, when SSBs are reused, the time relation between a subframe boundary time and SSBs is pre-defined, and this definition is provided to the UE in advance of SSB transmission from the base station. In this scenario, the base station signaling, which depends on SSB indices, is modified, accordingly.

In some implementations, when the PSS and SSS sequences are used to fill in the SSB slots, the sequences need to be modified so that a legacy UE can detect the legacy SSBs and ignore the filling sequences without the PSS/SSS timing ambiguity. This enables backwards compatibility for the enhanced SSBs with NR. A UE that is compatible with the enhanced SSB patterns can processing the enhanced SSB patterns while operating according to NR specifications. Both the legacy UE and the UE compatible with the enhanced SSB patterns can avoid timing or frequency uncertainty when processing the enhanced SSB pattern.

The systems and methods described herein provide one or more of the following advantages. The base station enables improved cell detection and PBCH decoding performance at low SNR by UEs that are expecting the enhanced SSB pattern(s). The UE obtains increased processing gain by processing the enhanced SSB pattern, which improves UE reception performance and network coverage. The enhanced SSB patterns and backwards compatibility described herein can be applied in any combination, depending on different system requirements. For example, the base station can perform, in a combination of the following SSB pattern enhancements, to achieve a best cell detection and PBCH decoding performance at low SNR. The SSB pattern enhancements can include SSB PRB filling, SSB symbol filling, SSB slot filling with adjacent SSB duplications, and backwards compatibility precoding. In addition, any one of these SSB enhancement processes can be applied individually or in any combination with one or more other examples. The enhanced SSB patterns described herein are helpful in use cases in which the SINR is low, such as for non-terrestrial networks, such as when a satellite is operating as a base station.

The details of one or more embodiments of these systems and methods are set forth in the accompanying drawings and the description below. Other features, objects, and advantages of these systems and methods will be apparent from the description and drawings, and from the claims.

DETAILED DESCRIPTION

Figure 1:
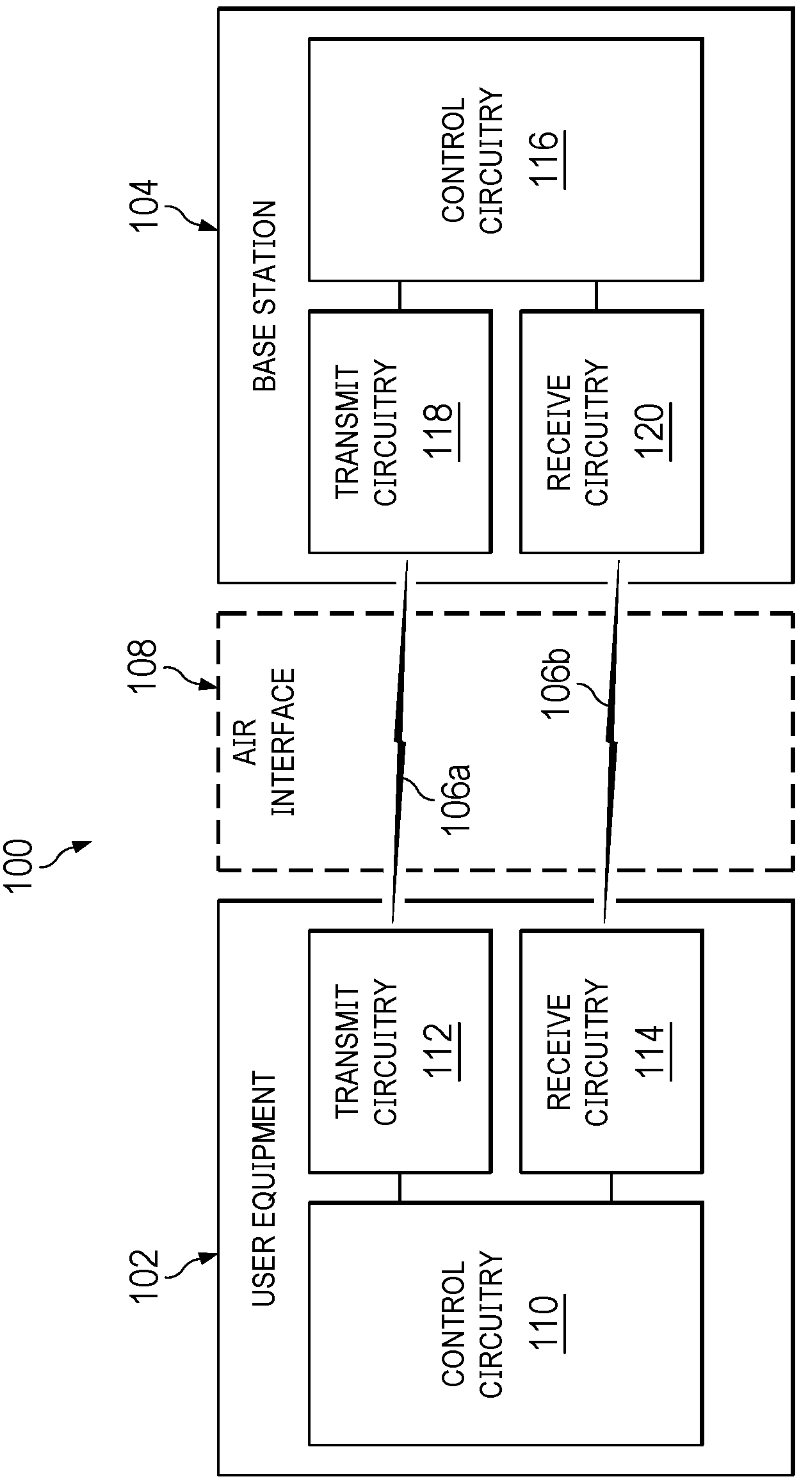
FIG. 1 illustrates a wireless network, in accordance with some embodiments.

This specification describes patterns of synchronization signal blocks (SSBs) for the Fifth Generation (5G) new radio (NR) networks or other networks. The SSBs are configured for transmitting the PSS and the SSS and the physical broadcast channel (PBCH) in resource elements (REs). Each SSB includes a defined pattern for the transmission of the PSS, SSS, and PBCH that includes master information blocks (MIBs). The pattern includes empty resource elements (REs) that are also called zero power REs. A resource element is the smallest unit of the resource grid made up of one subcarrier in frequency domain (e.g., 15 kHz subcarrier, 30 kHz subcarrier, etc.) and one Orthogonal Frequency Division Multiplexing (OFDM) symbol in time domain. For the sake of simplified description, a PRB is defined as 12 consecutive REs in frequency domain in this specification.

User equipment (UE) searches and processes SSBs to determine a timing and a frequency of a transmitted signal from a base station (e.g., gNB, node, etc.). The UE measures signal metrics such as a signal to noise ratio (SINR), Reference Signal Received Power (RSRP), and a Reference Signal Received Quality (RSRQ) based on the timing and the frequency of an SSB.

The existing NR SSB pattern is configured for scenarios in which the SINR is greater than −10 dB at the UE. In some instances, however, such as for non-terrestrial networks where a satellite is operating as a base station, the SINR may typically be lower. In these situations, the SSB pattern can be enhanced to improve cell detection and measurement performance by the UE under low-SINR scenarios. For example, in low-SINR and coverage enhancement scenarios, the UE can search an expanded PSS, SSS, or both to improve each of cell detection and performance.

To improve cell detection and measurement performance by the UE, the base station can enhance the SSB pattern in one or more of the following ways, individually or in any combination, including a superimposition of one another in the resource grid. Here, superimposition includes an application of two or more described implementations of the SSB pattern enhancement at the same time to a legacy SSB pattern. For example, if a first SSB pattern enhancement includes using a first unused RE for the PSS or the SSS, and a second SSB pattern enhancement includes using a second, different unused RE for the PSS or the SSS, the superimposition of the first and second SSB pattern enhancements would include using both of the first and second unused Res for the PSS or SSS. The SSB pattern enhancements can include SSB PRB filling. The SSB pattern enhancements can include SSB symbol filling. The SSB pattern enhancements can include SSB slot filling with adjacent SSB duplications. The SSB pattern enhancements can include backwards compatibility precoding.

The base station (e.g., gNB) can perform, in a single example or a combination of the SSB pattern enhancements in addition to, a supplementary protocol, to achieve a best cell detection and PBCH decoding performance at low SNR. The supplementary protocol signals to the UE that the SSB pattern is enhanced, and how the SSB pattern is enhanced. The enhanced SSB pattern information provided to the UE prevents the UE from expecting a conventional SSB pattern and misreading the enhanced SSB pattern as a legacy SSB pattern. Without the supplementary protocol signaling, the enhanced SSB pattern would disrupt UE timing and/or frequency measurements.

FIG. 1 illustrates a wireless network 100, in accordance with some embodiments. The wireless network 100 includes a UE 102 and a base station 104 connected via one or more channels 106A, 106B across an air interface 108. The UE 102 and base station 104 communicate using a system that supports controls for managing the access of the UE 102 to a network via the base station 104.

For purposes of convenience and without limitation, the wireless network 100 is described in the context of Long Term Evolution (LTE) and Fifth Generation (5G) New Radio (NR) communication standards as defined by the Third Generation Partnership Project (3GPP) technical specifications. More specifically, the wireless network 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless network 100 may also be a Standalone (SA) network that incorporates only NR. Furthermore, other types of communication standards are possible, including future 3GPP systems (e.g., Sixth Generation (6G)) systems, Institute of Electrical and Electronics Engineers (IEEE) 802.11 technology (e.g., IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies), IEEE 802.16 protocols (e.g., WMAN, WiMAX, etc.), or the like. While aspects may be described herein using terminology commonly associated with 5G NR, aspects of the present disclosure can be applied to other systems, such as 3G, 4G, and/or systems subsequent to 5G (e.g., 6G).

In the wireless network 100, the UE 102 and any other UE in the system may be, for example, laptop computers, smartphones, tablet computers, machine-type devices such as smart meters or specialized devices for healthcare monitoring, remote security surveillance systems, intelligent transportation systems, or any other wireless devices with or without a user interface. In network 100, the base station 104 provides the UE 102 network connectivity to a broader network (not shown). This UE 102 connectivity is provided via the air interface 108 in a base station service area provided by the base station 104. In some embodiments, such a broader network may be a wide area network operated by a cellular network provider, or may be the Internet. Each base station service area associated with the base station 104 is supported by antennas integrated with the base station 104. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector.

The UE 102 includes control circuitry 110 coupled with transmit circuitry 112 and receive circuitry 114. The transmit circuitry 112 and receive circuitry 114 may each be coupled with one or more antennas. The control circuitry 110 may be adapted to receive and decode the enhanced SSB disclosed herein. The control circuitry 110 may include various combinations of application-specific circuitry and baseband circuitry. The transmit circuitry 112 and receive circuitry 114 may be adapted to transmit and receive data, respectively, and may include radio frequency (RF) circuitry or front-end module (FEM) circuitry, including communications using codecs as described herein.

In various embodiments, aspects of the transmit circuitry 112, receive circuitry 114, and control circuitry 110 may be integrated in various ways to implement the circuitry described herein. The control circuitry 110 may be adapted or configured to perform various operations such as those described elsewhere in this disclosure related to a UE. For example, the control circuitry can be adapted to process the enhanced SSB patterns discussed with respect to FIGS. 3-12. The control circuitry 110 is configured to process the PSS, SSS, and PBCH data included in the enhanced SSB patterns described herein. For example, during cell search procedures, the UE can acquire time and frequency synchronization with a cell and to detect Physical layer Cell ID (PCI) of the cell based on the synchronization signal and/or PBCH data of the enhanced SSB patterns. The UE 102 uses the synchronization signals and PBCH to determine how to access a given cell. Synchronization signals can also be used by the control circuitry 110 of the UE for RSRP and RSRQ measurements.

The transmit circuitry 112 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 112 may be configured to receive block data from the control circuitry 110 for transmission across the air interface 108. Similarly, the receive circuitry 114 may receive a plurality of multiplexed downlink physical channels from the air interface 108 and relay the physical channels to the control circuitry 110. The plurality of downlink physical channels may be multiplexed according to TDM or FDM along with carrier aggregation. The transmit circuitry 112 and the receive circuitry 114 may transmit and receive both control data and content data (e.g., messages, images, video, etc.) structured within data blocks that are carried by the physical channels.

FIG. 1 also illustrates the base station 104. In embodiments, the base station 104 may be an NG radio access network (RAN) or a 5G RAN, an E-UTRAN, a non-terrestrial cell, or a legacy RAN, such as a UTRAN or GERAN. As used herein, the term "NG RAN" or the like may refer to the base station 104 that operates in an NR or 5G wireless network 100, and the term "E-UTRAN" or the like may refer to a base station 104 that operates in an LTE or 4G wireless network 100. The UE 102 utilizes connections (or channels) 106A, 106B, each of which includes a physical communications interface or layer.

The base station 104 circuitry may include control circuitry 116 coupled with transmit circuitry 118 and receive circuitry 120. The transmit circuitry 118 and receive circuitry 120 may each be coupled with one or more antennas that may be used to enable communications via the air interface 108.

The control circuitry 116 of the base station configures the enhanced SSB patterns described herein, such as in relation to FIGS. 3-12. The control circuitry selects one or more patterns for the SSB that use REs that are otherwise unused in legacy SSB patterns. The control circuitry uses the selected SSB pattern in various scenarios, such as if a low-SINR and coverage enhancement scenarios are expected for the UE 102. The control circuitry 116 configures the SSB pattern based on the SCS and the available REs of the resource grid for the PBCH, PSS, and SSS.

The transmit circuitry 118 and receive circuitry 120 may be adapted to transmit and receive data, respectively, to any UE connected to the base station 104 using data generated with various codecs described herein. The transmit circuitry 118 may transmit downlink physical channels includes of a plurality of downlink sub-frames. The receive circuitry 120 may receive a plurality of uplink physical channels from various UEs, including the UE 102.

In this example, the one or more channels 106A, 106B are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In embodiments, the UE 102 may directly exchange communication data via a ProSe interface. The ProSe interface may alternatively be referred to as a SL interface and may include one or more logical channels, including but not limited to a PSCCH, a PSSCH, a PSDCH, and a PSBCH.

Figure 2:
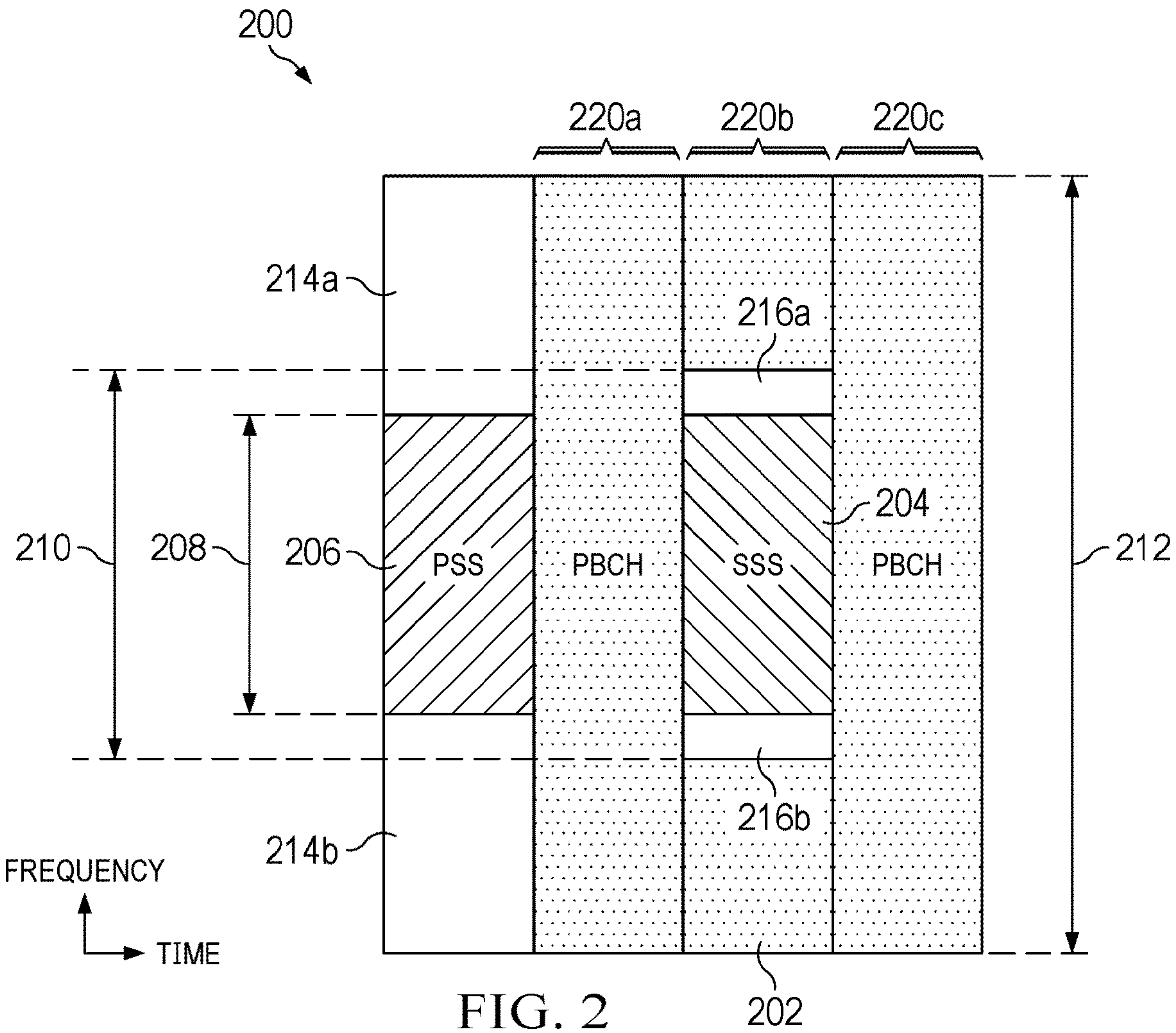
FIG. 2 shows a diagram of an SSB pattern.

FIG. 2 shows a diagram 200 of an SSB pattern. The diagram 200 includes a resource grid showing occupied and unoccupied resource elements (REs) for PSS, SSS and PBCH. As previously described, the SSB includes PSS symbol 206 with a pseudo-random sequence related to a cell-ID-2. The SSB includes a SSS symbol 204 with cell-ID-1 related pseudo-random sequence. The SSB includes symbols for the Physical Broadcast Channel (PBCH) that includes PBCH-demodulation reference signal (PBCH-DMRS). There are 3 symbols 220*a*, 220*b*, 220*c* allocated for the PBCH. The SSB includes Zero Resource Elements (RE) 214*a*, 214*b* and 216*a*, 216*b*. Zero resource elements are generally empty REs in the SSB. In an example, there are 113 zero REs around the PSS at resources 214*a*-214*b*. There are 17 zero REs around the SSS 204 at resources 216*a* and 216*b*. The range 208 includes 127 subcarriers. The range 210 includes 144 subcarriers. The range 212 includes 240 subcarriers.

There are 4 different numerologies for SSB with subcarrier spacing (SCS), including 15 kHz, 30 kHz, 120 kHz, 240 KHz. Generally, below a 6 GHz carrier frequency, the SCS is one of 15 kHz or 30 kHz. Generally, above 6 GHz carrier frequency, the SCS is one of 120 kHz or 240 kHz. Generally, there are eight patterns for the SS burst set, such as within a 5 millisecond window. An SSB pattern includes the number of n SSBs, with one SSB per gNodeB transmission beam. Up to $L_{MAX}$ transmission beams can be transmitted, with $0<n=<L_{MAX}$. The configured SSB patterns include Case A for FR1 SCS 15 kHz and $L_{MAX}=4$ or 8. The configured SSB patterns include Cases B and C for $L_{MAX}=4$ and 8, respectively, with FR1 SCS 30 kHz. The configured SSB patterns include Case-D for FR2 SCS 120 kHz and $L_{MAX}=64$. The configured SSB patterns include Case-E for FR2 SCS 240 kHz and $L_{MAX}=64$. Generally, a periodicity of the SS burst set is one of 5, 10, 20, 40, 80, or 160 milliseconds (ms). Generally, the UE assumes 20 ms periodicity for initial access. For a connected or idle mode, the network configures the periodicity. In some implementations, SCS of 480 kHz or 960 kHz (e.g., for a 60 GHz band) are possible. While certain examples are enumerated for SCS, the processes described herein can be useful for any given SCS, as the process is not specific to any particular SCS.

Figure 3:
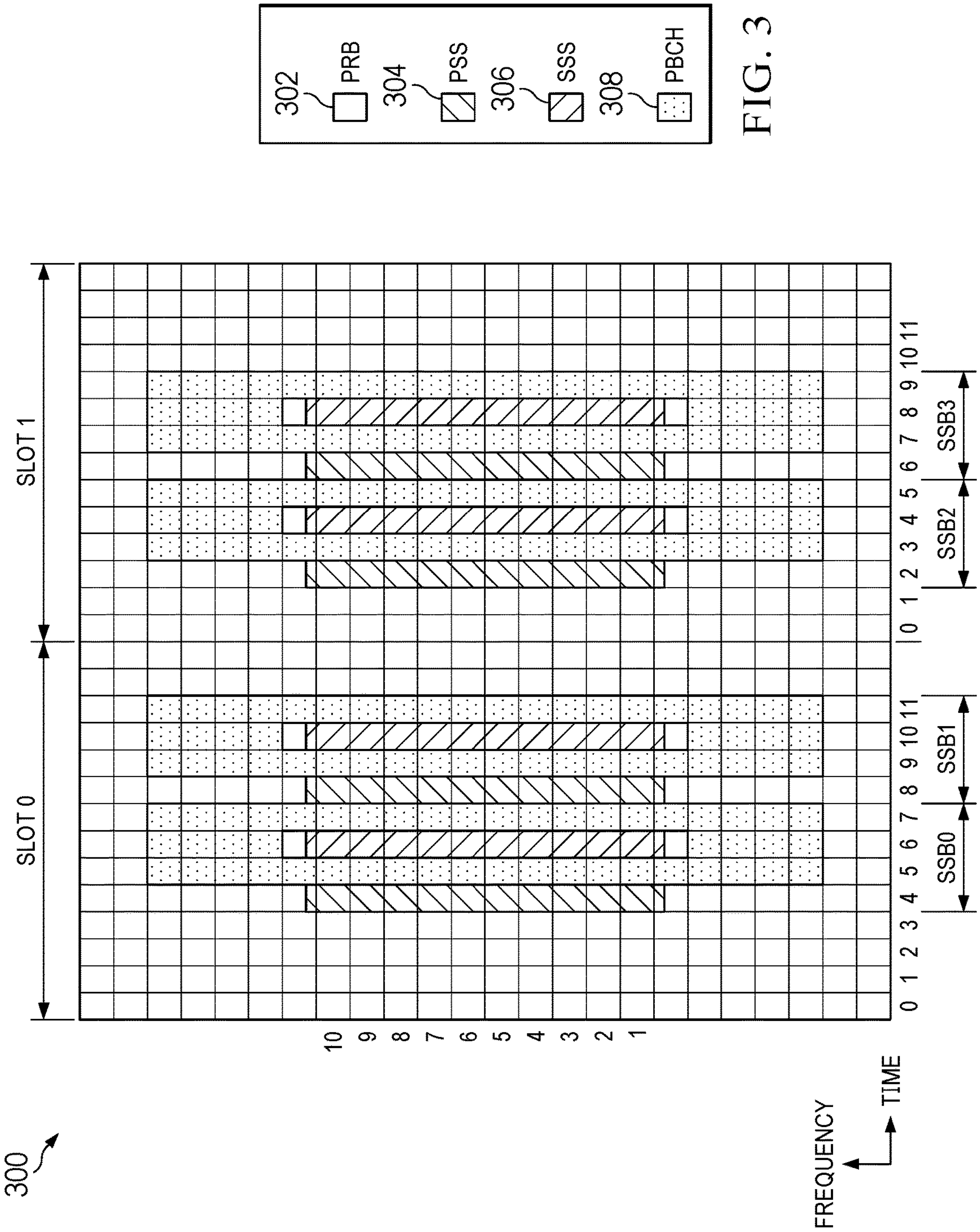
FIG. 3 shows a diagram of an SSB pattern.

FIG. 3 shows a diagram of an SSB pattern in a resource grid 300. The SSB pattern 300 can be enhanced by filling empty PRBs 302 in the resource grid. The resource grid 300 includes representations of two slots: slot 0, which includes SSB 0 and SSB 1, and a second slot, which includes SSB 2 and SSB 3. The resource grid 300 shows that each SSB includes PRBs configured for the PSS 304, the SSS 306, and the PBCH 308, as previously described.

Enhanced SSB patterns described herein are configured by the base station (e.g., gNB) by extending the PSS, SSS, and PBCH into adjacent REs/PRBs that are unused in legacy SSB patterns, as subsequently described in greater detail. The base station can send the configuration to the UE in advance of transmission of the SSBs, or the UE can be otherwise preconfigured to expect a particular enhanced SSB pattern. All enhanced SSB patterns described herein can be extended or combined with each other SSB pattern, and/or other numerologies. For an example to illustrate enhancement of SSB patterns, the resource grid 300 and subsequent resource grids are shown with SCS 30 kHz SSB pattern case B and signal bandwidth (BW) of 24 PRB. However, this is an example numerology, and other numerologies previously described can also be used for the SSB patterns described herein.

For resource grid 300, the SSB pattern case B is shown, including 4 SSBs (SSB 0, SSB1, SSB 2, and SSB 3) in 2 slots, where there are 2 consecutive SSBs for each 0.5 ms slot. There are un-used or zeros PRBs 302 around PSS 304 and SSS 306 symbols. These symbols are shown as respective shaded resources in the resource grid. Generally, there are three sets of non-SSB four symbols blocks adjacent to the 4 SSBs in the two slots. In particular, symbols 0-3 of slot 0, symbols 12 and 13 of slot 0 and symbols 0 and 1 of slot 1, and symbols 10-13 of slot 1 may be considered non-SSB symbols. These are resources marked as 302.

Figure 4:
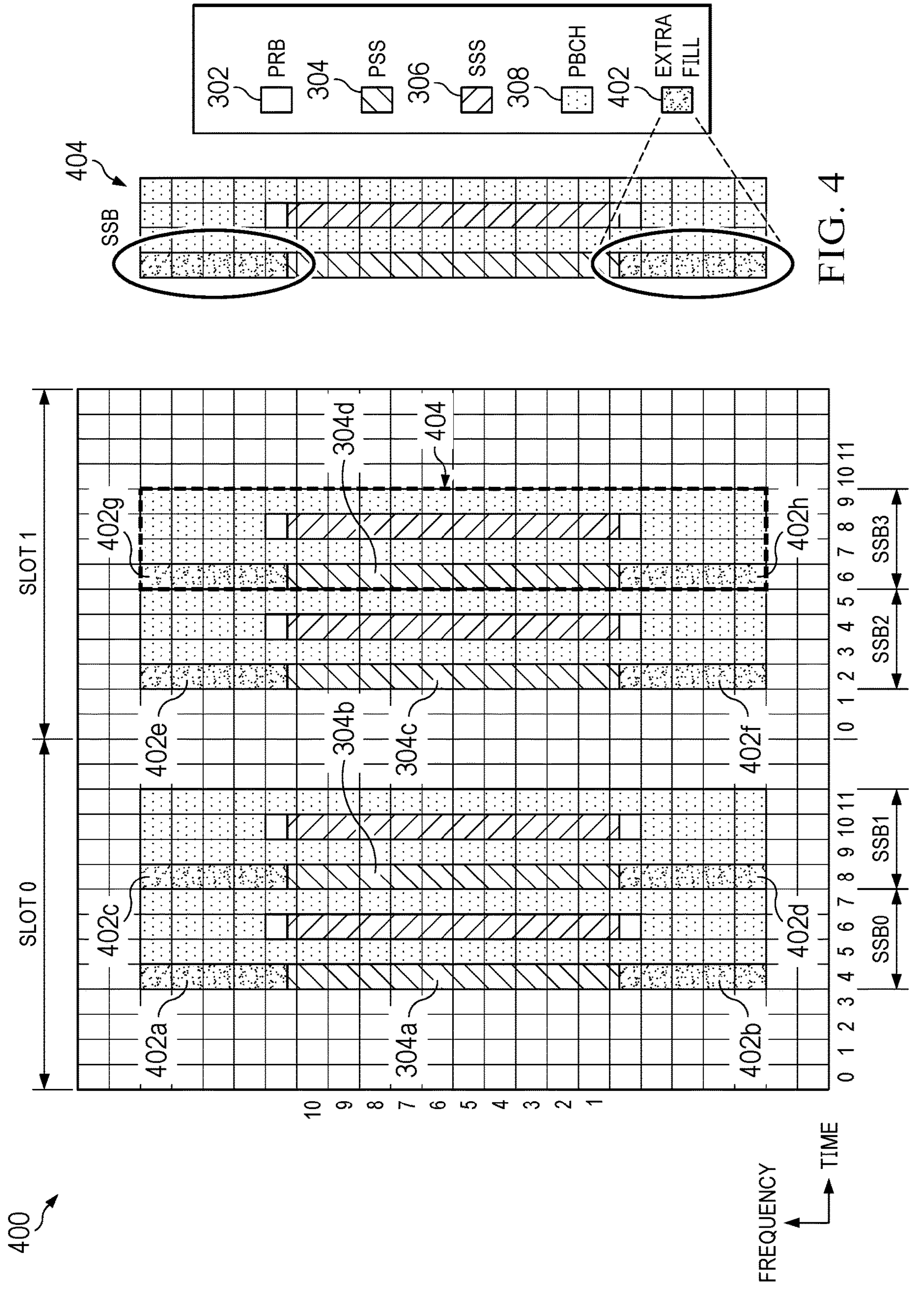
FIG. 4 shows a diagram of an enhanced SSB pattern including SSB PRB filling.

FIG. 4 shows a diagram of an enhanced SSB pattern 400 on resource grid 300. The enhanced SSB pattern 400 includes SSB PRB filling. For this SSB pattern 400, the base station is configured to fill empty (or zero power) RE/PRBs 402 above and/or below the PSS REs 304 for some or all SSB PRBs in an SSB burst. Specifically, the group of PRBs 402*a* and 402*b* is filled in REs adjacent to the first PSS 304*a* of SSB 0. The group of PRBs 402*c* and 402*d* are filled for REs adjacent to the second PSS 304*b* of SSB 1. The group of PRBs 402*e* and 402*f* are filled for REs adjacent to the third PSS 304*c* of SSB 2. The group of PRBs 402*g* and 402*f* are filled for REs adjacent to the fourth PSS 304*d* of SSB 3. An example instance 404 shows an enhanced SSB that is used for each of SSBs 0-3.

Each of resources 402 are extra fill. The same or different cell ID2/cellID1 related random sequences (compared with 3GPP defined PSS/SSS sequences) can be used as the filling sequences. This extends the PSS and SSS. In an example, a same PSS sequence 402 (as instances 402*a-h*) is used to fill the empty REs above and below each set of PSS REs in each of the two slots for every SSB instance SSB 0-3. In some implementations, the sequences 402*a-h* can each be different sequences.

The extra fill 402 of the SSB pattern 400 enables cell detection performance gain. For example, the performance gain can be about 2.7 dB ($=10*\log_{10}(20\times12/127)$), assuming legacy cell detection based on one PSS symbol detection.

Figure 5:
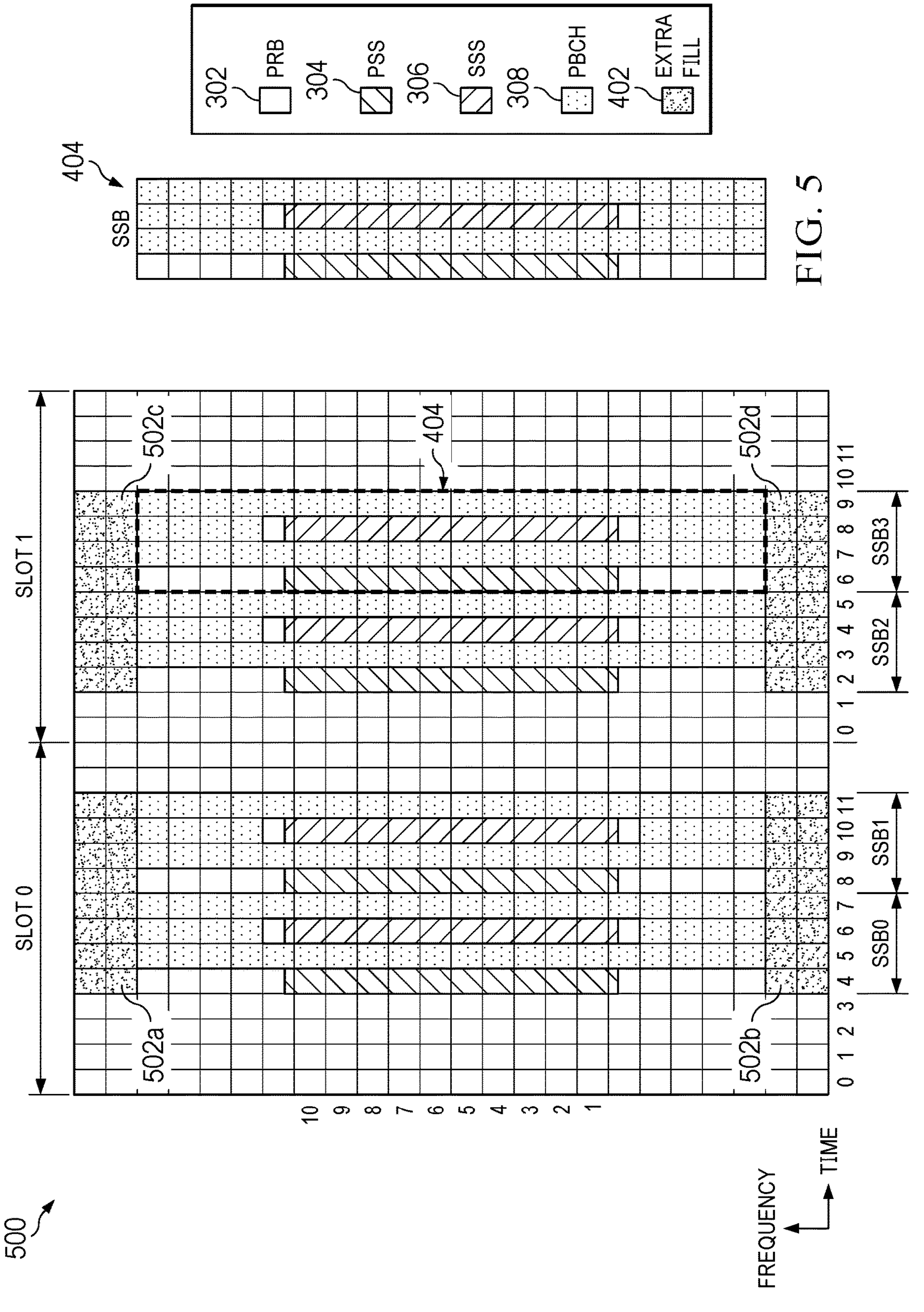
FIG. 5 shows a diagram of an enhanced SSB pattern including SSB OFDM symbol filling.

FIG. 5 shows a diagram of an enhanced SSB pattern 500 on resource grid 300. The enhanced SSB pattern 500 includes SSB OFDM symbol filling. The base station is configured to fill PRBs at frequency resource both above and below the SSB PRBs for some or all SSB symbols in an SSB burst. For example, the PRBs 502*a* are above the first and second SSBs in slot 0. The PRBs 502*b* are below the first and second SSBs in slot 0. The PRBs 502*c* are above the second and third SSBs in slot 1. The PRBs 502*d* are below the second and third SSBs in slot 1. Each of the PRBs 502 include extra fill sequence 402.

The base station can use either same or different cell ID 2/cell ID 1-related random sequences, compared with 3GPP defined PSS/SSS sequences. These sequences are used as the filling sequences for the PRBs 502. In an example, a same PSS sequence 402 is used to fill the PRBs above and below SSB PRBs in each set of SSB symbols 502*a-d* in two slots.

The enhanced SSB pattern 500 provides a cell detection performance gain. In some implementations, the gain is about 4 dB ($=10*\log_{10}((4\times4\times12+127)/127)$), assuming legacy cell detection based on one PSS symbol detection. In some implementations, for a narrow-band signal bandwidth, avoiding use of the PRBs above and/or below SSBs for data channel can improve data reception efficiency. Otherwise, those SSB symbols need to be processed for extracting data PRBs with low density presence in the SSB symbols for SSB 0-3. The base station does not need to fill all the PRBs/REs of the PRB groups 502*a-d*. Any sub-portion of these groups may be filled, adjacent to the SSBs. The bases station provides the configuration to the UE in advance of SSB transmission, or the UE is preconfigured to anticipate the actual SSB pattern 400 in advance of SSB reception.

Figure 6:
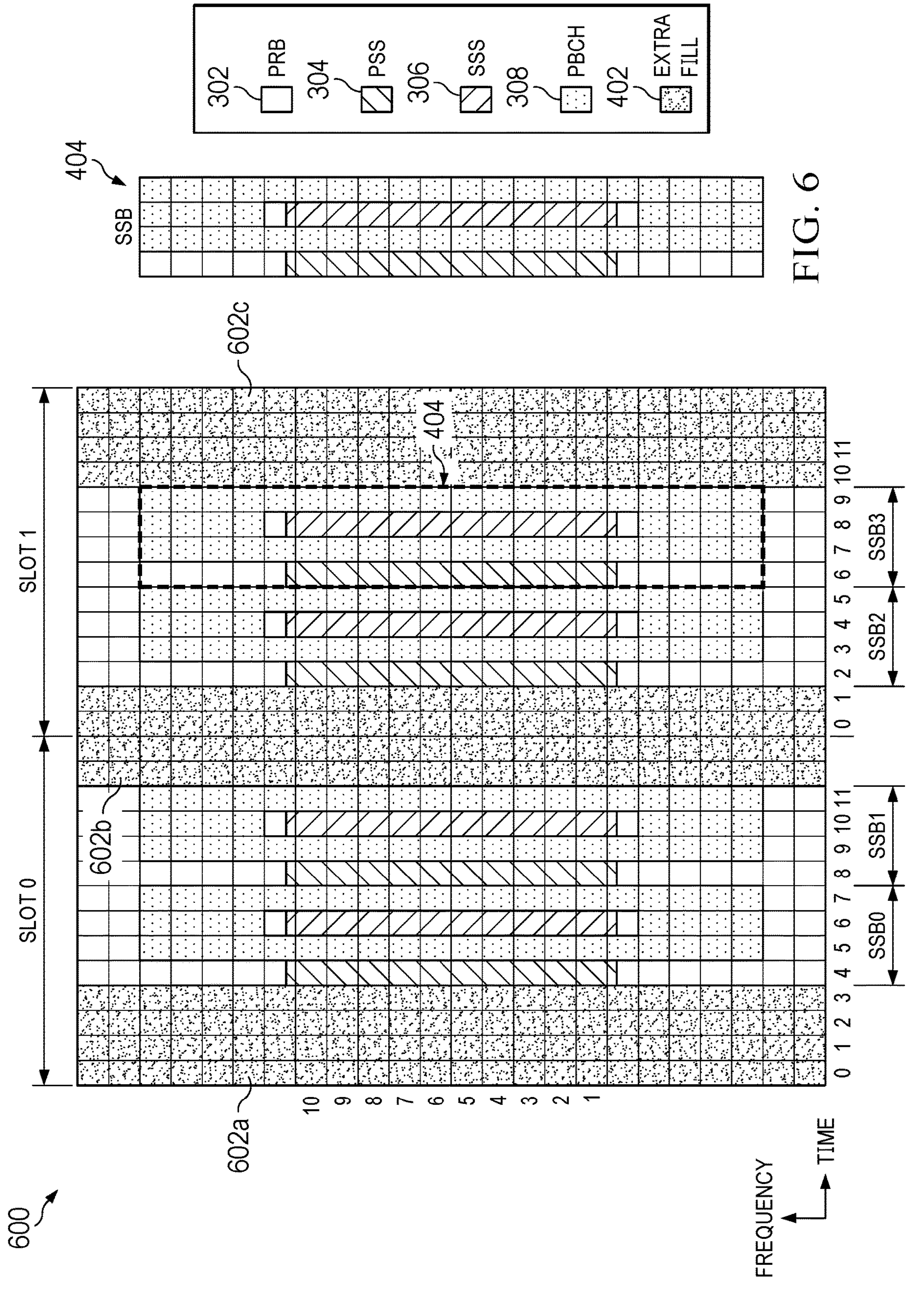
FIG. 6 shows a diagram of an enhanced SSB pattern including filling of slots that contain SSBs.

FIG. 6 shows a diagram of an enhanced SSB pattern 600 on resource grid 300. The SSB pattern including filling PRBs/symbols of slots including an SSB. The base station is configured to fill PRBs/symbols close to regular SSBs in time domain. The extra fill sequence 402 can be applied for some or for all SSB PRBs in the SSB burst of resource grid 300. In some implementations, the same or different cell ID 2/cell ID 1-related random sequences (e.g., compared with 3GPP defined PSS/SSS sequences) can be used as the filling sequences 402. Specifically, the PRBs of groups 602*a-c* are filled with these sequences 402. While all PRBs/symbols close to SSBs in time domain are shown as including the extra fill sequences 402 for each of groups 602*a-c*, a portion of these PRBs/symbols may be used instead for each or for all of the groups, in any combination. The group 602*a* includes PRBs/REs in the slot 0 at all or some symbols prior in time to SSB 0. The group 602*b* includes PRBs/REs in the slot 0 at all or some symbols subsequent in time to SSB 1 and PRBs/REs in the slot 1 at all or some symbols prior in time to SSB 2. The group 602*c* includes PRBs/REs in the slot 0 at all or some symbols subsequent in time to SSB 3. In this example, a same PSS sequence 402 is used to fill the empty REs in each of the two slots. However, different PSS sequences can be used.

The enhanced SSB pattern 600 enables a cell detection performance gain. The gain is about 8.3 dB ($=10*\log_{10}(24\times 12\times 3/127)$), assuming legacy cell detection based on one PSS symbol detection.

Figure 7:
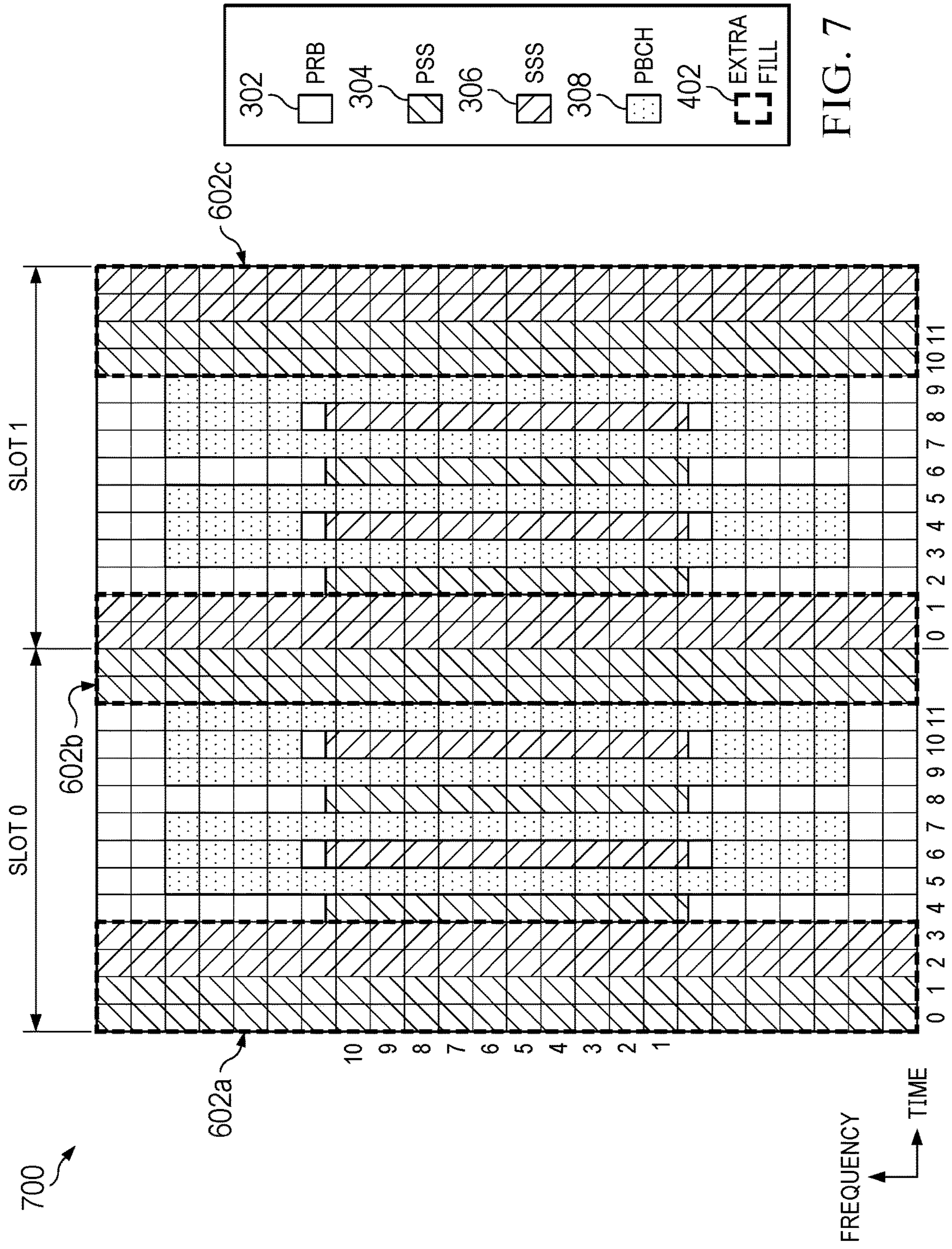
FIG. 7 shows a diagram of an enhanced SSB pattern including examples of filling SSB-containing slots.

FIG. 7 shows a diagram of an enhanced SSB pattern 700 for resource grid 300. The SSB pattern 700 includes examples of filling slots that contain an SSB. The empty PRBs/REs are filled with extra filling sequences 402 as described in relation to FIG. 6. Groups 602*a*, 602*b*, and 602*c* each include both PSS PRBs 304 and SSS PRBs 306. In the SSB pattern 700, the PSS is extended to PRBs at symbol 0 and symbol 1 (all subcarriers of a symbol) for group 602*a* in slot 0. The SSS is extended to PRBs at symbol 2 and symbol 3 (all subcarriers of a symbol) for group 602*a* in slot 0. The PSS is extended to PRBs at symbol 12 and symbol 13 (all subcarriers of a symbol) for group 602*b* in slot 0. The SSS is extended to PRBs at symbol 0 and symbol 1 (all subcarriers of a symbol) for group 602*b* in slot 1. The PSS is extended to PRBs at symbol 10 and symbol 11 (all subcarriers of a symbol) for group 602*c* in slot 1. The SSS is extended to PRBs at symbol 12 and symbol 13 (all subcarriers of a symbol) for group 602*c* in slot 1.

Figure 8:
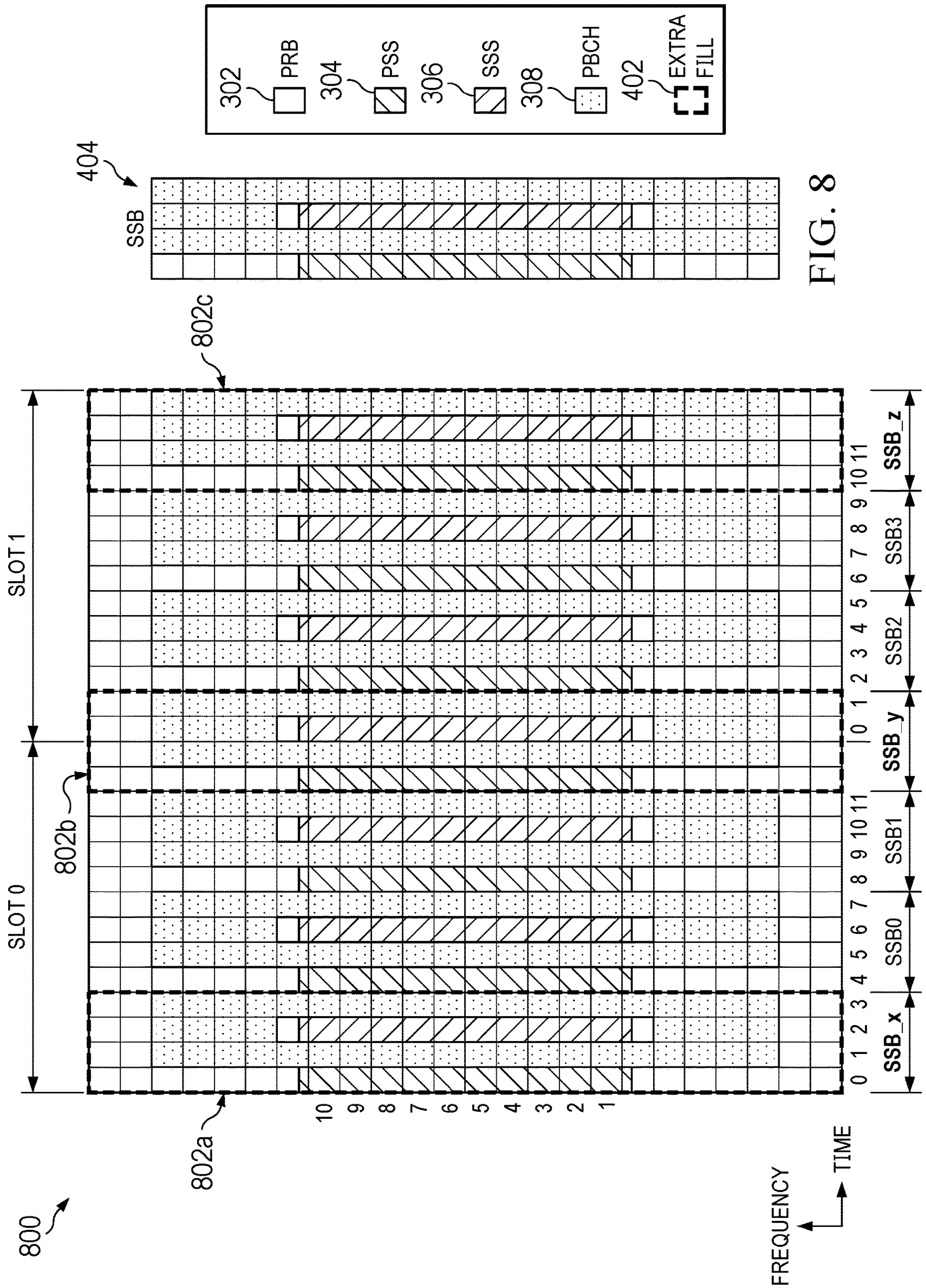
FIG. 8 shows a diagram of an enhanced SSB pattern including examples of filling SSB-containing slots.

FIG. 8 shows a diagram of an enhanced SSB pattern 800 for resource grid 300. The SSB pattern 800 includes examples of filling slots of an SSB burst with additional instances 802 of SSBs. The SSB instances 802*a*, 802*b*, and 802*c* are used to fill non-SSB symbols. The SSB instances 802*a*, 802*b*, and 802*c* can be retransmitted SSBs of any of SSB 0, SSB 1, SSB 2, or SSB 3. In some implementations, the SSB instances 802*a-c* each have a same SSB index. In some implementations, the SSB instances 802*a-c* each have a different SSB index, e.g., 8, 9 and 10. In some implementations, a subset of the SSB instances 802*a-c* each have a same SSB index, and the remaining SSB instances have one or more other indices. The SSB index configuration can be communicated to the UE in advance of SSB transmission, or the UE can be preconfigured with the expected SSB index configuration, the UE can apply a mechanism to estimate the SSB index. For example, the UE is preconfigured with the expected timing relation between SSB subframe boundary and each SSB index. For example, a UE detects an SSB position by identifying a correct index from PBCH-DMRS sequence with an index from 0 to 7.

Figure 9:
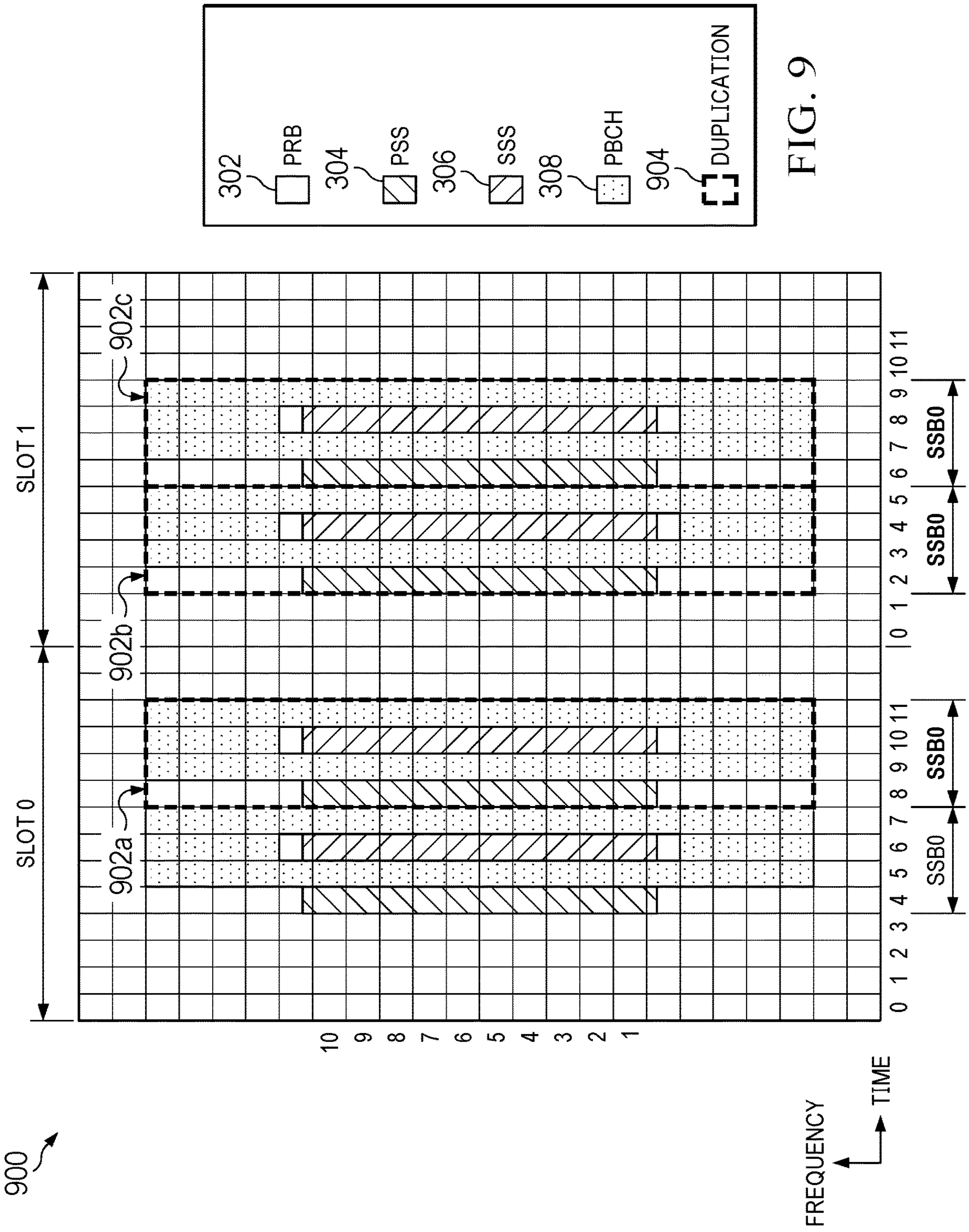
FIG. 9 shows a diagram of an enhanced SSB pattern including SSB repetition for a single transmission beam or for a reduced number of transmission beams.

FIG. 9 shows a diagram of an enhanced SSB pattern 900 in the resource grid 300. The SSB pattern includes an SSB repetition for a single transmission beam. Generally, different SSBs are designed to be transmitted from different base station transmission beams, respectively. In some implementations, for given communications or systems, a single beam or reduced number of transmit beams can be used. In these scenarios, the SSBs transmitted from available transmit beams can be duplicated to fill the other SSBs corresponding to "absent" transmit beams. For example, for a single SSB beam system, SSB 0 is repeated three times to fill the other "vacant" SSB resources. The SSB 0 is repeated for each SSB in the slots 0 and 1. The SSB 0 is repeated for resources of 902*a*, 902*b*, and 902*c*. The duplicated SSB 0 is shown by dotted lines 904. The repeated SSB 0 can improve decoding performance for the UE by up to 6 dB gain. Other combinations are possible. For example, if two transmit beams are needed, SSB 0 and SSB 1 can be duplicated at positions 902*b* and 902*c*, respectively. In some implementations, if three transmit beams are needed, one of the three SSBs 0, 1, or 2 can be retransmitted in the "vacant" SSB 3 position. Any such combination of SSB duplication in "vacant" SSB resources can be performed in this manner.

The enhanced SSB pattern 900 enables a simplified implementation design relative to using different SSB indices. Each different SSB index corresponds to a respective different PBCH-DMRS sequence. Generally, a cell detection performance gain can be achieved due to increased number of PSS and SSS REs. For example, when PSS is repeated three times, using 4 PSS symbols for PSS detection can achieve up to 6 dB gain compared with using one PSS for PSS detection. The decoding performance gain can be achieved by using duplicated PBCH transmission 308.

Figure 10:
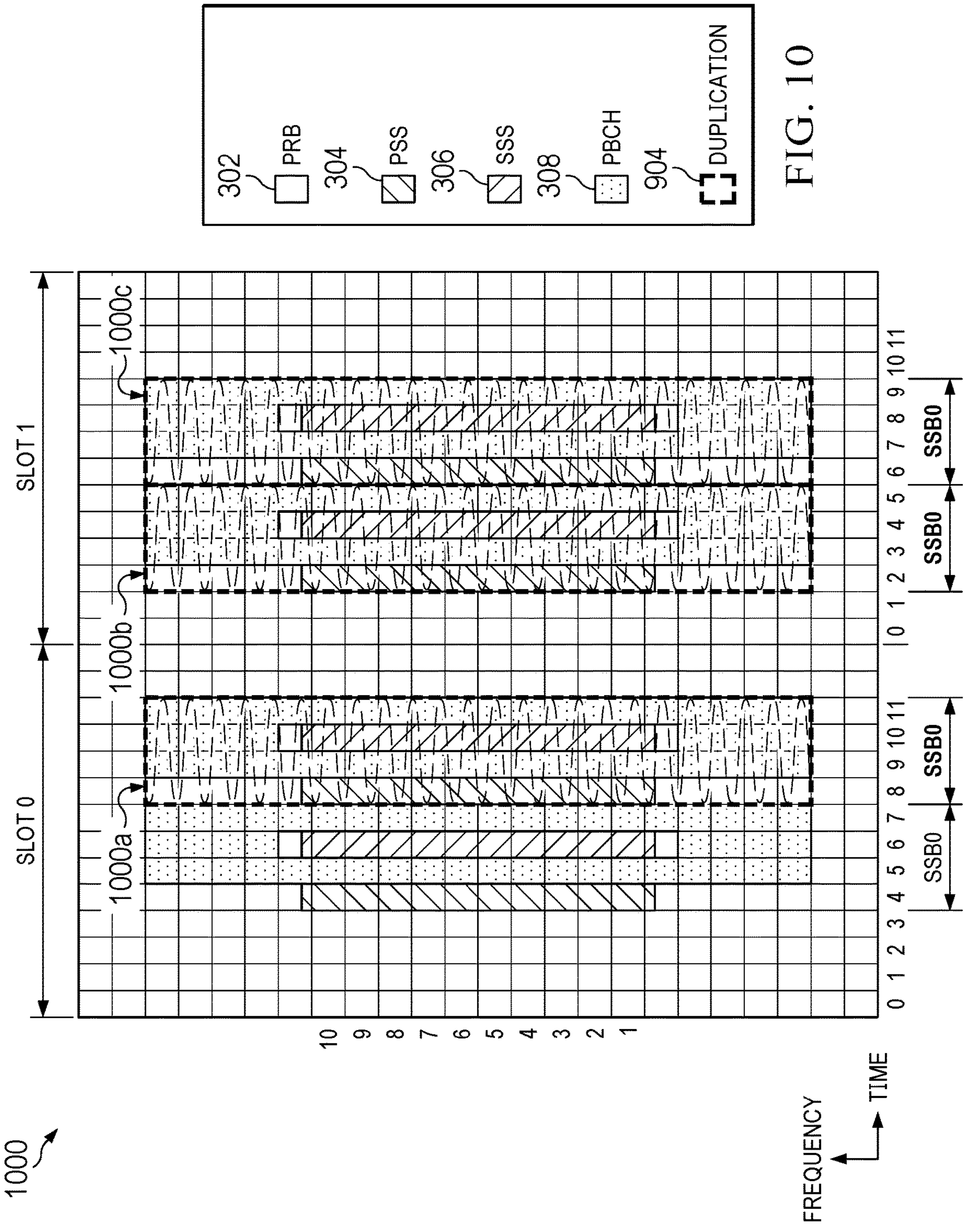
FIG. 10 shows a diagram of an enhanced SSB pattern with backwards compatibility.

FIG. 10 shows a diagram of an enhanced SSB pattern 1000 for resource grid 300. The SSB pattern 1000 is configured for backwards compatibility with legacy NR platforms that incorporate enhanced SSB patterns described herein. Generally, when the PSS, the SSS, or an SSB are directly repeated in a non-legacy NR compliant manner (e.g., enhanced SSB patterns 700, 800, 900), it shall cause confusion when UE conducts time and/or frequency synchronization relying on the NR SSB patterns. Therefore, the repeated SSB needs to be modified in a specific manner, such that the modified SSB signals can be ignored by a legacy UE, without causing timing and/or frequency ambiguity. For example, a pre-defined random sequence can be superimposed on the repeated SSB. Since the random sequence is not pre-known by the legacy UE, the UE shall be able to detect the modified SSB. For a UE that has the capability to process the modified SSB (i.e., a non-legacy UE), the random sequence needs to be pre-known by both the base station and the UE.

If the system using an enhanced SSB pattern is operating in a legacy NR network (NW), the legacy UE (unknown of the enhanced SSB pattern) can receive the legacy PSS, SSS and PBCH symbols without timing or frequency uncertainty. This provides backwards compatibility of the enhanced SSB pattern. This avoids degrading legacy UE reception performance.

To enable backwards compatibility, the base station can superimpose a pre-defined random sequence on a reused SS sequence. The "superimposition treated" SS sequence does not cause confusion for cell search of legacy NR UEs. In an example, the SSB 0 is repeated three times in single transmission beam scenario, described for pattern 900 in relation to FIG. 9. The base station reuses a PSS sequence of p(i), i=0, 1, . . . , 126. The pre-defined random sequence is r(i). The “superimposition treated” SS sequence is p(i)=p(i)*r'(i), i=0, 1, . . . , 126, where r'(i) is conjugate of r(i). One simple example of r(i) is a random sequence with elements of +1 or −1’s.

In this example, the legacy UE will only detect the true SSB 0, and will ignore the duplicated SSB instances 1000*a*, 1000*b*, 1000*c*. Only when a UE with enhanced capability is preconfigured to know the random sequences used to “superimposition treat” the SSB duplicate instances 1000*a*, 1000*b*, 1000*c*, the UE can detect those SSB instances.

Figure 11:
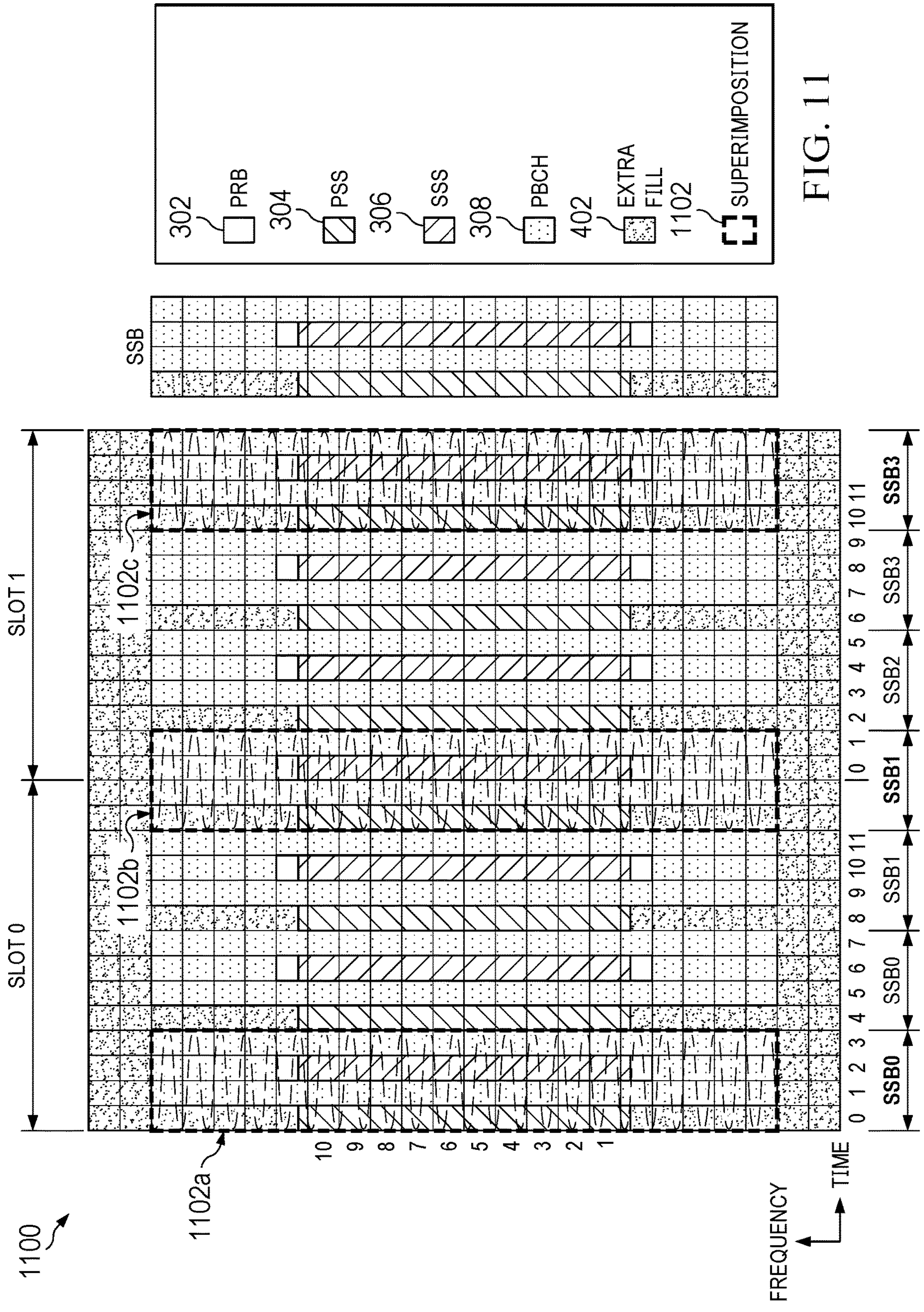
FIG. 11 shows a diagram of an enhanced SSB pattern including combination of one or more patterns of FIGS. 3-10.

FIG. 11 shows a diagram of an enhanced SSB pattern 1100 including combination of one or more patterns of FIGS. 3-10. In this example, all or parts of patterns 400, 500, 600, 700, 800, 900, and 1000 are combined in part or in full. The base station is configured to superimpose a pre-defined random sequence on a reused SS sequence that uses the same subcarriers of the legacy SSBs. Then the “superimposition treated” SS sequence does not cause confusion for cell search of legacy NR UEs, as previously described in relation to FIG. 10. This example pattern 1100 includes each of the previously described patterns 400, 500, 600, 700, 800, 900, and 1000. This combination includes SSB PRB filling, SSB symbol filling, SSB slot filling with adjacent SSB duplications, and backwards compatibility.

Figure 12A:
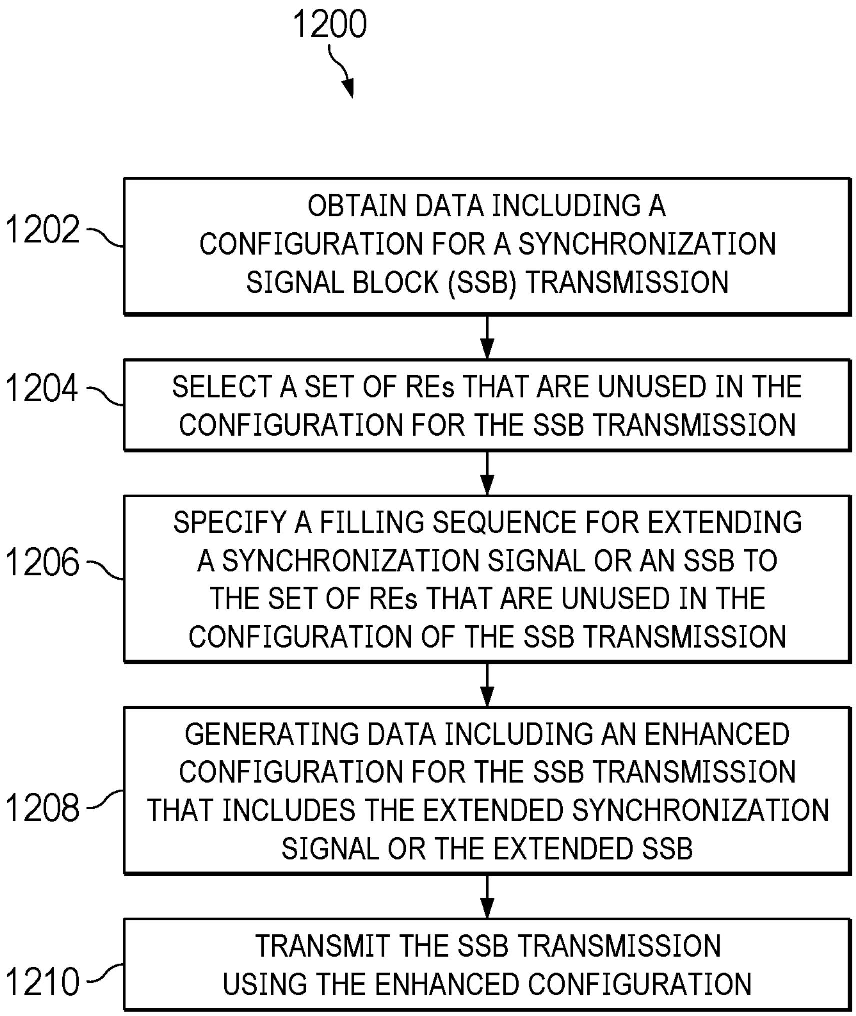
FIG. 12A shows a process for transmitting an SSB having one of the SSB patterns described in relation to FIGS. 2-11.

FIG. 12A shows a process 1200 configuring an enhanced SSB pattern including one of the SSB patterns described in relation to FIGS. 2-11. The process 1200 includes obtaining (1202) data including a configuration for a Synchronization Signal Block (SSB) transmission that includes a physical broadcast channel (PBCH). The configuration specifies, for an SSB of the configuration, resource elements (REs) allocated for transmitting a primary synchronization signal (PSS) and/or a secondary synchronization signal (SSS) to a user equipment (UE).

The process 1200 includes selecting (1204) a set of REs that are unused in the configuration for the SSB transmission. In some implementations, the set of REs that are unused in the configuration comprise REs that are adjacent to the PSS of the SSB. In some implementations, the set of REs that are unused in the configuration comprise PRBs in the same OFDM symbols as the SSB and being unused by the SSB. In some implementations, the set of REs that are unused in the configuration comprise PRBs at OFDM symbols that are in a slot including the SSB and at times other than during transmission of the SSB. In some implementations, the OFDM symbols may not be empty, but can be used for data channel (e.g., PDSCH) transmission.

The process 1200 includes specifying (1206) a filling sequence for extending a synchronization signal to the set of REs that are unused in the configuration of the SSB transmission. In some implementations, the filling sequence comprises a PSS related random sequence for extending the PSS. In some implementations, the filling sequence comprises a SSS related random sequence for extending the SSS. In some implementations, the filling sequence comprises a PBCH related sequence for extending the PBCH.

The process 1200 includes generating (1208) data including an enhanced configuration for the SSB transmission that includes the extended synchronization signal. The process 1200 includes transmitting (1210) the SSB transmission using the enhanced configuration.

In some implementations, the process 1200 includes extending the PSS into a first subset of the unused OFDM symbols in the slot and extending the SSS into a second subset of the unused OFDM symbols in the slot. In some implementations, the process 1200 includes configuring repeating instances of the SSB in the unused OFDM symbols in the slot. In some implementations, SSB index related signaling in the filling SSB can be different from the originally repeated SSB. In some implementations, two different SSBs are repeated. In some implementations, the process 1200 includes configuring a superimposing random sequence for each repeated instance of the SSB, the predefined random sequence being known to each of the base station and the UE prior to transmission of the SSB by the base station.

In some implementations, a subcarrier spacing of the PRBs is selectable from one of 15 kilohertz (kHz), 30 kHz, 120 kHz, or 240 kHz, and wherein a periodicity of the SSB transmission is selectable from one of 5 milliseconds, 10 ms, 20 ms, 40 ms, 80 ms, or 160 ms.

In some implementations, the process 1200 includes sending to the UE, prior to transmission of the SSB, the data including the enhanced configuration for the SSB transmission. In some implementations, the base station comprises a satellite, and the transmission environment has a SINR of −10 dB. In some implementations, the data including the enhanced configuration for the SSB transmission enables a cell detection performance gain of at least 2.7 dB relative to the cell detection performance of the configuration for the SSB that is not enhanced. In some implementations, the data including the enhanced configuration for the SSB transmission enables a cell detection performance gain of at least 4.0 dB relative to the cell detection performance of the configuration for the SSB that is not enhanced.

In some implementations, the filling sequence comprises a PSS related random sequence for extending the PSS, a SSS related random sequence for extending the SSS, and a PBCH related sequence for extending the PBCH in a combination. In some implementations, the enhanced configuration is compatible for use by a legacy UE that is not preconfigured to receive the SSB transmission using the enhanced configuration.

The example processes 1200, can be modified or reconfigured to include additional, fewer, or different steps (not shown in FIGS. 12A-12C), which can be performed in the order shown or in a different order.

Figure 12B:
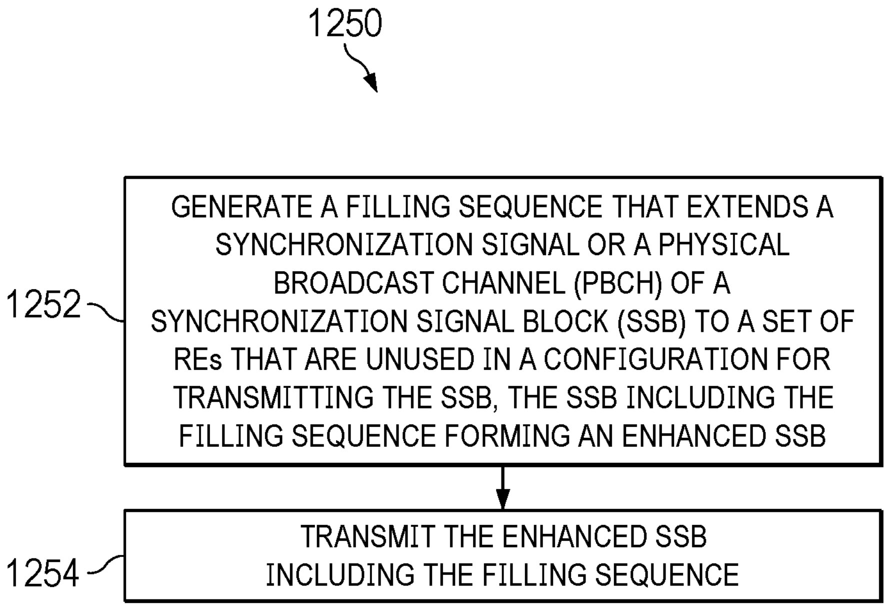
FIG. 12B shows a process for transmitting an SSB having one of the SSB patterns described in relation to FIGS. 2-11.

FIG. 12B shows a process 1250 for transmitting an SSB having one of the SSB patterns described in relation to FIGS. 2-11. The process 1250 includes generating (1252) (e.g., by a base station) a filling sequence that extends a synchronization signal or a physical broadcast channel (PBCH) of a Synchronization Signal Block (SSB) to a set of REs that are unused in a configuration for transmitting the SSB. The SSB includes the filling sequence to form an enhanced SSB. The unused REs are generally empty in legacy SSB configurations. The process 1250 includes transmitting (1254) the enhanced SSB including the filling sequence. For example, the enhanced SSB can be transmitted to a UE.

Figure 12C:
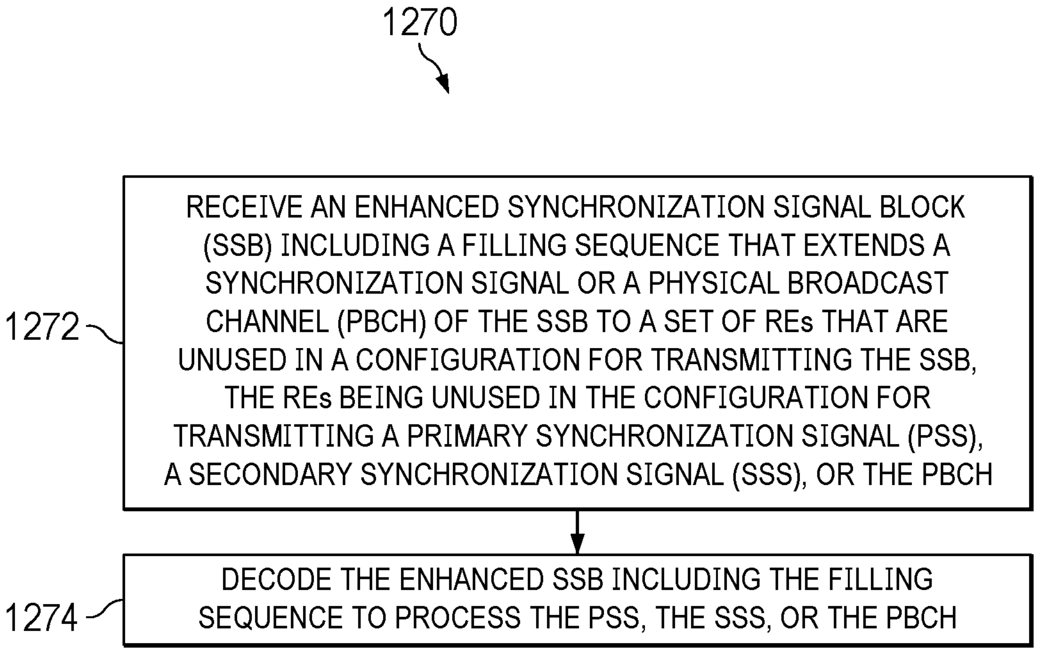
FIG. 12C shows a process for receiving an SSB having one of the SSB patterns described in relation to FIGS. 2-12B.

FIG. 12C shows a process 1270 for receiving (1272) (e.g., by a UE) an SSB having one of the SSB patterns described in relation to FIGS. 2-12B. The process 1270 includes receiving (1272) an enhanced Synchronization Signal Block (SSB) including a filling sequence that extends a synchronization signal or a physical broadcast channel (PBCH) of the SSB to a set of REs that are unused in a configuration for transmitting the SSB. The REs are unused in the configuration for transmitting a primary synchronization signal (PSS), a secondary synchronization signal (SSS), or the PBCH to the UE. Generally, unused REs are empty in legacy SSB configurations. The process 1270 includes decoding (1274) the enhanced SSB including the filling sequence to process the PSS, the SSS, or the PBCH.

Figure 13:
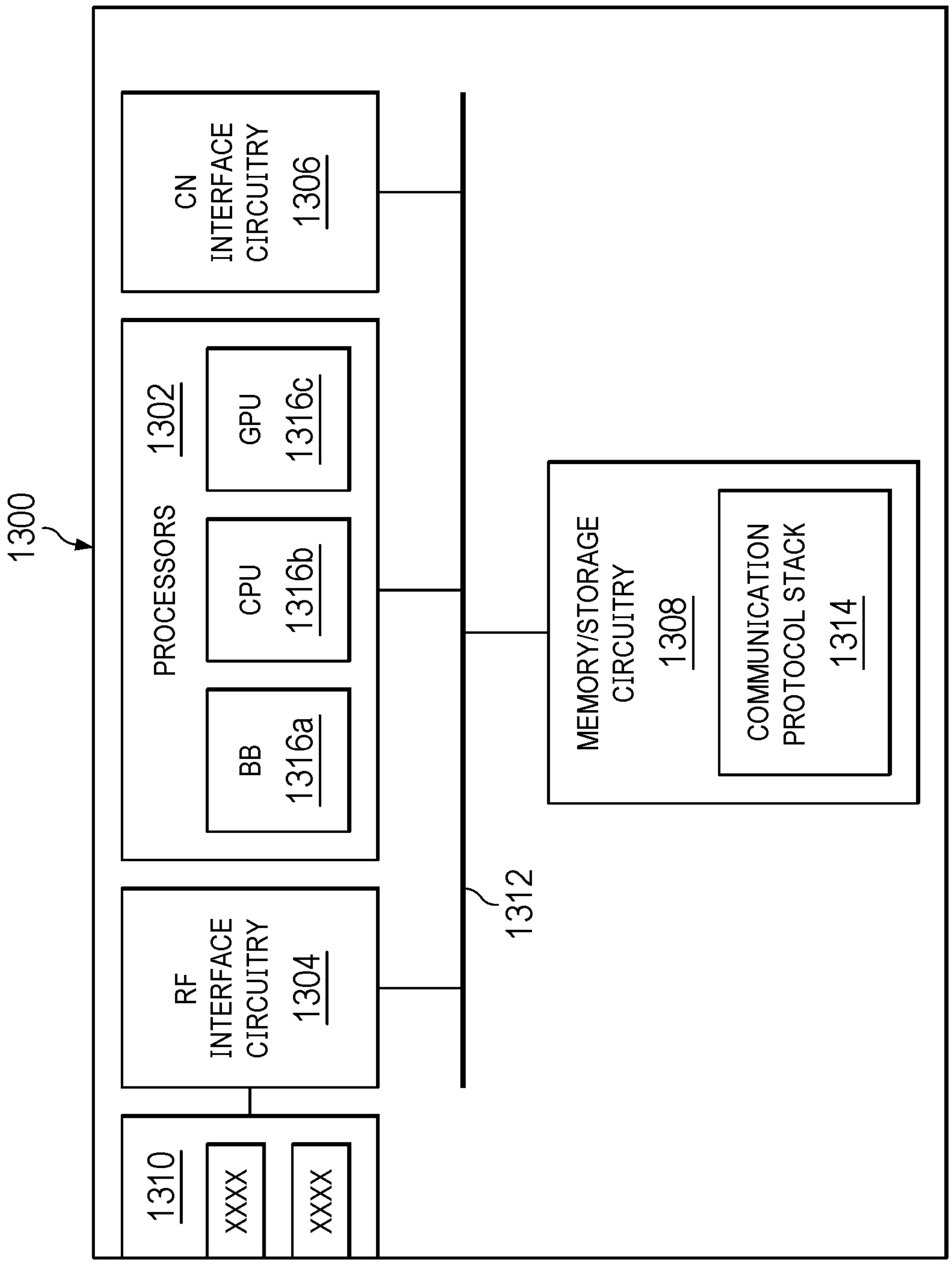
FIG. 13 illustrates a user equipment (UE), in accordance with some embodiments.

FIG. 13 illustrates an access node 1300 (e.g., a base station or gNB), in accordance with some embodiments. The access node 1300 may be similar to and substantially interchangeable with base station 104. The access node 1300 may include processors 1302, RF interface circuitry 1304, core network (CN) interface circuitry 1306, memory/storage circuitry 1308, and antenna structure 1310.

The memory 1308 can store instructions that are executed by processors 1302 that cause the base station 1300 to perform specific operations, such as processes 1200 and 1250, previously described, for transmitting or receiving the enhanced SSBs of FIGS. 2-11. Some of those operations may require use of the RF circuitry 1304 or antenna 1310 to transmit the enhanced SSBs described herein. The processors 1302 of the access node 1300 are configured to obtain the enhanced configuration specifying the enhanced SSB pattern for transmission, configure the enhanced SSB according to the enhanced configuration, and cause the RF circuitry 1304 or antenna 1310 to transmit the enhanced SSB in accordance with the enhanced SSB pattern.

The components of the access node 1300 may be coupled with various other components over one or more interconnects 1312. The processors 1302, RF interface circuitry 1304, memory/storage circuitry 1308 (including communication protocol stack 1314), antenna structure 1310, and interconnects 1312 may be similar to like-named elements shown and described with respect to FIG. 14. For example, the processors 1302 may include processor circuitry such as, for example, baseband processor circuitry (BB) 1316A, central processor unit circuitry (CPU) 1316B, and graphics processor unit circuitry (GPU) 1316C.

The CN interface circuitry 1306 may provide connectivity to a core network, for example, a 5th Generation Core network (5GC) using a 5GC-compatible network interface protocol such as carrier Ethernet protocols, or some other suitable protocol. Network connectivity may be provided to/from the access node 1300 via a fiber optic or wireless backhaul. The CN interface circuitry 1306 may include one or more dedicated processors or FPGAs to communicate using one or more of the aforementioned protocols. In some implementations, the CN interface circuitry 1306 may include multiple controllers to provide connectivity to other networks using the same or different protocols.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to an access node 1300 that operates in an NR or 5G system (for example, a gNB), and the term "E-UTRAN node" or the like may refer to an access node 1300 that operates in an LTE or 4G system (e.g., an eNB). According to various embodiments, the access node 1300 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the access node 1300 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by the access node 1300; a MAC/PHY split wherein RRC, PDCP, RLC, and MAC layers are operated by the CRAN/vBBUP and the PHY layer is operated by the access node 1300; or a "lower PHY" split wherein RRC, PDCP, RLC, MAC layers and upper portions of the PHY layer are operated by the CRAN/vBBUP and lower portions of the PHY layer are operated by the access node 1300.

Figure 14:
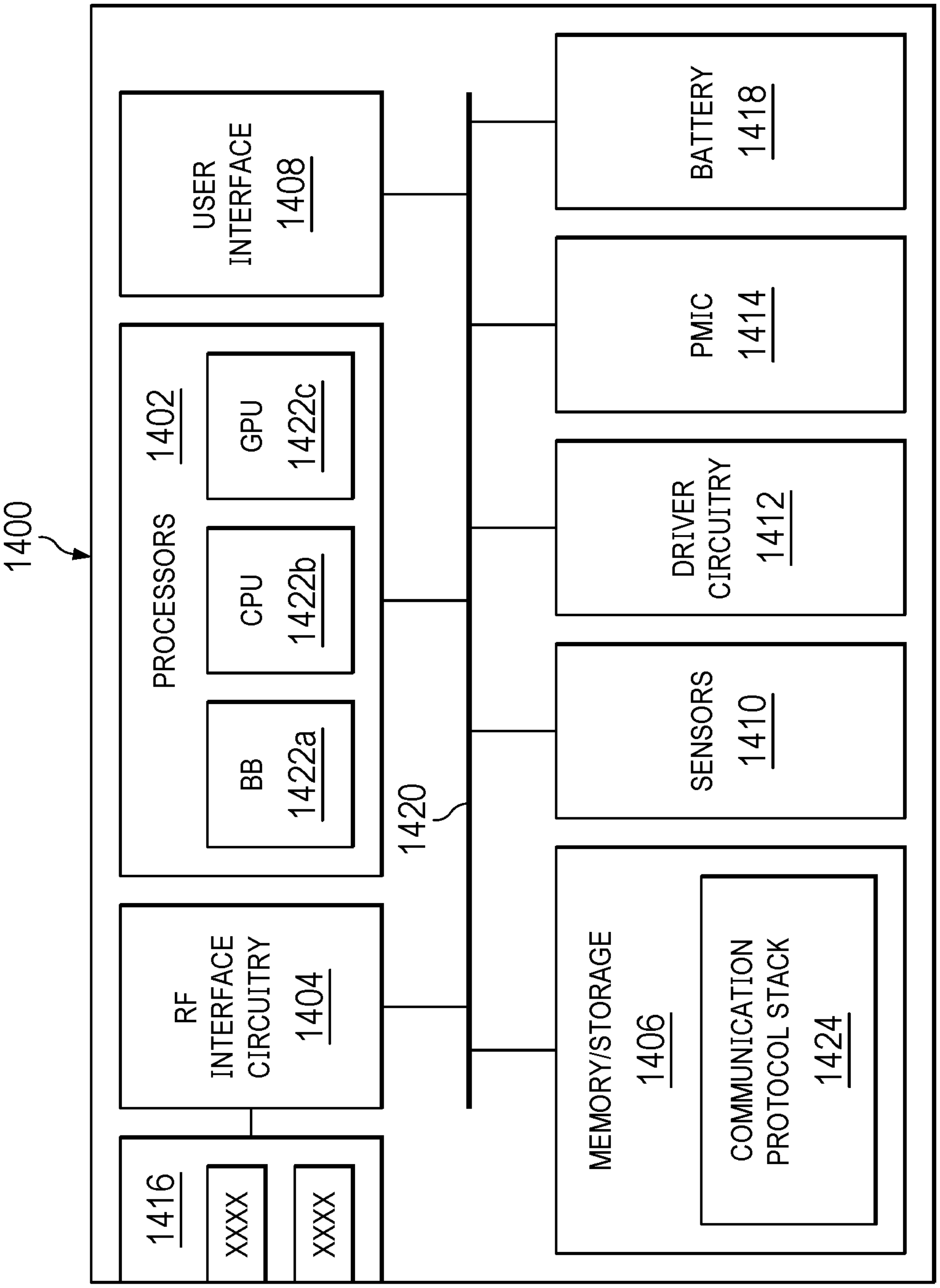
FIG. 14 illustrates an access node, in accordance with some embodiments.

FIG. 14 illustrates a UE 1400, in accordance with some embodiments. The UE 1400 may be similar to and substantially interchangeable with UE 102 of FIG. 1. The UE 1400 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 1400 may include processors 1402, RF interface circuitry 1404, memory/storage 1406, user interface 1408, sensors 1410, driver circuitry 1412, power management integrated circuit (PMIC) 1414, antenna structure 1416, and battery 1418. The components of the UE 1400 may be implemented as integrated circuits (ICs), portions thereof, discrete electronic devices, or other modules, logic, hardware, software, firmware, or a combination thereof. The block diagram of FIG. 14 is intended to show a high-level view of some of the components of the UE 1400. However, some of the components shown may be omitted, additional components may be present, and different arrangement of the components shown may occur in other implementations.

The components of the UE 1400 may be coupled with various other components over one or more interconnects 1420, which may represent any type of interface, input/output, bus (local, system, or expansion), transmission line, trace, optical connection, etc. that allows various circuit components (on common or different chips or chipsets) to interact with one another.

The processors 1402 may include processor circuitry such as, for example, baseband processor circuitry (BB) 1422A, central processor unit circuitry (CPU) 1422B, and graphics processor unit circuitry (GPU) 1422C. The processors 1402 may include any type of circuitry or processor circuitry that executes or otherwise operates computer-executable instructions, such as program code, software modules, or functional processes from memory/storage 1406 to cause the UE 1400 to perform operations as described herein, such as process 1270 of FIG. 12C.

The memory 1406 can store instructions that are executed by processors 1402 that cause the UE 1400 to perform specific operations, such as process 1270, previously described, for transmitting or receiving the enhanced SSBs of FIGS. 2-11. Some of those operations may require use of the RF circuitry 1404 or antenna 1416 to receive the enhanced SSBs described herein. The processors 1302 of the UE 1400 are configured to decode the enhanced SSB. In some implementations, the UE receives the enhanced configuration data specifying the enhanced SSB pattern prior to receiving the SSB transmission. The UE decodes the PBCH, PSS, and/or SSS in accordance with the enhanced configuration.

In some embodiments, the baseband processor circuitry 1422A may access a communication protocol stack 1424 in the memory/storage 1406 to communicate over a 3GPP compatible network. In general, the baseband processor circuitry 1422A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 1404. The baseband processor circuitry 1422A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 1406 may include one or more non-transitory, computer-readable media that includes instructions (for example, communication protocol stack 1424) that may be executed by one or more of the processors 1402 to cause the UE 1400 to perform various operations described herein. The memory/storage 1406 include any type of volatile or non-volatile memory that may be distributed throughout the UE 1400. In some embodiments, some of the memory/storage 1406 may be located on the processors 1402 themselves (for example, L1 and L2 cache), while other memory/storage 1406 is external to the processors 1402 but accessible thereto via a memory interface. The memory/storage 1406 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1404 may include transceiver circuitry and radio frequency front module (RFEM) that allows the UE 1400 to communicate with other devices over a radio access network. The RF interface circuitry 1404 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1416 and proceed to filter and amplify (with a low-noise amplifier) the signal. The signal may be provided to a receiver of the transceiver that downconverts the RF signal into a baseband signal that is provided to the baseband processor of the processors 1402.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1416.

In various embodiments, the RF interface circuitry 1404 may be configured to transmit/receive signals in a manner compatible with NR access technologies.

The antenna 1416 may include antenna elements to convert electrical signals into radio waves to travel through the air and to convert received radio waves into electrical signals. The antenna elements may be arranged into one or more antenna panels. The antenna 1416 may have antenna panels that are omnidirectional, directional, or a combination thereof to enable beamforming and multiple input, multiple output communications. The antenna 1416 may include microstrip antennas, printed antennas fabricated on the surface of one or more printed circuit boards, patch antennas, phased array antennas, etc. The antenna 1416 may have one or more panels designed for specific frequency bands including bands in FRI or FR2.

The user interface 1408 includes various input/output (I/O) devices designed to enable user interaction with the UE 1400. The user interface 1408 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1400.

The sensors 1410 may include devices, modules, or subsystems whose purpose is to detect events or changes in its environment and send the information (sensor data) about the detected events to some other device, module, subsystem, etc. Examples of such sensors include, inter alia, inertia measurement units including accelerometers, gyroscopes, or magnetometers; microelectromechanical systems or nanoelectromechanical systems including 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1412 may include software and hardware elements that operate to control particular devices that are embedded in the UE 1400, attached to the UE 1400, or otherwise communicatively coupled with the UE 1400. The driver circuitry 1412 may include individual drivers allowing other components to interact with or control various input/output (I/O) devices that may be present within, or connected to, the UE 1400. For example, driver circuitry 1412 may include a display driver to control and allow access to a display device, a touchscreen driver to control and allow access to a touchscreen interface, sensor drivers to obtain sensor readings of sensor circuitry 1428 and control and allow access to sensor circuitry 1428, drivers to obtain actuator positions of electro-mechanic components or control and allow access to the electro-mechanic components, a camera driver to control and allow access to an embedded image capture device, audio drivers to control and allow access to one or more audio devices.

The PMIC 1414 may manage power provided to various components of the UE 1400. In particular, with respect to the processors 1402, the PMIC 1414 may control power-source selection, voltage scaling, battery charging, or DC-to-DC conversion.

In some embodiments, the PMIC 1414 may control, or otherwise be part of, various power saving mechanisms of the UE 1400 including DRX as discussed herein. A battery 1418 may power the UE 1400, although in some examples the UE 1400 may be mounted deployed in a fixed location, and may have a power supply coupled to an electrical grid. The battery 1418 may be a lithium ion battery, a metal-air battery, such as a zinc-air battery, an aluminum-air battery, a lithium-air battery, and the like. In some implementations, such as in vehicle-based applications, the battery 1418 may be a typical lead-acid automotive battery.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method having operations including obtaining data including a configuration for a Synchronization Signal Block (SSB) transmission carrying a physical broadcast channel (PBCH), the configuration specifying, for an SSB of the configuration, resource elements (REs) allocated for transmitting a primary synchronization signal (PSS) to a user equipment (UE) and REs allocated for transmitting a secondary synchronization signal (SSS) to the UE; selecting a set of REs that are unused in the configuration for the SSB transmission; specifying a filling sequence for extending a synchronization signal or an SSB to the set of REs that are unused in the configuration of the SSB transmission; generating data including an enhanced configuration for the SSB transmission that includes the extended synchronization signal or the extended SSB; and transmitting the SSB transmission using the enhanced configuration.

Example 2 may include the method described in example 1, wherein the filling sequence comprises a PSS related random sequence for extending the PSS.

Example 3 may include the method described in any of examples 1-2, wherein the filling sequence comprises a SSS related random sequence for extending the SSS.

Example 4 may include the method described in any of examples 1-3, wherein the filling sequence comprises a PBCH related sequence for extending the PBCH.

Example 5 may include the method described in any of examples 1-4, wherein the set of REs that are unused in the configuration comprise REs that are adjacent to the PSS of the SSB.

Example 6 may include the method described in any of examples 1-5, wherein the set of REs that are unused in the configuration comprise PRBs at OFDM symbols that are at a same time as the SSB and at frequencies unused by the SSB.

Example 7 may include the method described in any of examples 1-7, wherein the set of REs that are unused in the configuration comprise PRBs at OFDM symbols that are in a slot including the SSB and at times other than during transmission of the SSB.

Example 8 may include the method described in any of examples 1-8, further comprising extending the PSS into a first subset of the unused OFDM symbols in the slot and extending the SSS into a second subset of the unused OFDM symbols in the slot.

Example 9 may include the method described in any of examples 1-9, further comprising configuring repeating instances of the SSB in the unused OFDM symbols in the slot.

Example 10 may include the method described in any of examples 1-9, wherein SSB index related signaling in the filling SSB may be different from the originally repeated SSB.

Example 11 may include the method described in any of examples 1-10, wherein two different SSBs are repeated.

Example 12 may include the method described in any of examples 1-11, further comprising configuring a pre-defined random sequence for superimposing on each repeated instance of the SSB, the pre-defined random sequence being known to each of the base station and the UE prior to transmission of the SSB by the base station.

Example 13 includes the method described in any of examples 1-12, wherein a subcarrier spacing of the REs is selectable from one of 15 kilohertz (kHz), 30 kHz, 120 kHz, 240 kHz, 480 kHz, or 960 kHz and wherein a periodicity of the SSB transmission is selectable from one of 5 milliseconds, 10 ms, 20 ms, 40 ms, 80 ms, or 160 ms.

Example 14 includes the method described in any of examples 1-12, further comprising sending to the UE, prior to transmission of the SSB, the data including the enhanced configuration for the SSB transmission.

Example 15 includes the method described in any of examples 1-12, wherein the base station comprises a satellite.

Example 16 includes the method described in any of examples 1-12, wherein the data including the enhanced configuration for the SSB transmission enables a cell detection performance gain of at least 2.7 dB using at least 108 additional REs, relative to the cell detection performance of the configuration for the SSB that is not enhanced.

Example 17 includes the method described in any of examples 1-12, wherein the filling sequence comprises a combination of a PSS related random sequence for extending the PSS, a SSS related random sequence for extending the SSS, and a PBCH related sequence for extending the PBCH.

Example 18 includes the method described in any of examples 1-12, wherein the enhanced configuration is compatible for use by a legacy UE that is not preconfigured to receive the SSB transmission using the enhanced configuration.

Example 19 may include user equipment comprising one or more processors configured to receive the SSB transmission of any of claims 1 to 18.

Example 20 may include one or more non-transitory computer-readable media including instructions to cause an electronic device, upon execution of the instructions by one or more processors of the electronic device, to perform one or more elements of a method described in or related to any of examples 1-19, or any other method or process described herein.

Example 21 may include an apparatus including logic, modules, or circuitry to perform one or more elements of a method described in or related to any of examples 1-19, or any other method or process described herein.

Example 22 may include a method, technique, or process as described in or related to any of examples 1-19, or portions or parts thereof.

Example 23 may include an apparatus including: one or more processors and one or more computer-readable media including instructions that, when executed by the one or more processors, cause the one or more processors to perform the method, techniques, or process as described in or related to any of examples 1-19, or portions thereof.

Example 24 may include a signal as described in or related to any of examples 1-19, or portions or parts thereof.

Example 25 may include a datagram, information element, packet, frame, segment, PDU, or message as described in or related to any of examples 1-19, or portions or parts thereof, or otherwise described in the present disclosure.

Example 26 may include a signal encoded with data as described in or related to any of examples 1-19, or portions or parts thereof, or otherwise described in the present disclosure.

Example 27 may include a signal encoded with a datagram, IE, packet, frame, segment, PDU, or message as described in or related to any of examples 1-19, or portions or parts thereof, or otherwise described in the present disclosure.

Example 28 may include an electromagnetic signal carrying computer-readable instructions, wherein execution of the computer-readable instructions by one or more processors is to cause the one or more processors to perform the method, techniques, or process as described in or related to any of examples 1-19, or portions thereof.

Example 29 may include a computer program including instructions, wherein execution of the program by a processing element is to cause the processing element to carry out the method, techniques, or process as described in or related to any of examples 1-19, or portions thereof. The operations or actions performed by the instructions executed by the processing element can include the methods of any one of examples 1-19.

Example 30 may include a signal in a wireless network as shown and described herein.

Example 31 may include a method of communicating in a wireless network as shown and described herein.

Example 32 may include a system for providing wireless communication as shown and described herein. The operations or actions performed by the system can include the methods of any one of examples 1-19.

Example 33 may include a device for providing wireless communication as shown and described herein. The operations or actions performed by the device can include the methods of any one of examples 1-19.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method comprising:

receiving a Synchronization Signal Block (SSB) including a sequence that extends a synchronization signal or a physical broadcast channel (PBCH) of the SSB to a set of resource elements (REs) that are unused in a pre-configuration for transmitting the SSB, the REs being unused in the pre-configuration for transmitting a primary synchronization signal (PSS), a secondary synchronization signal (SSS), or the PBCH, wherein a number of subcarriers for the PSS, SSS, or the PBCH is increased from the pre-configuration to extend the PSS, SSS, or the PBCH; and sending, based on decoding the SSB including the sequence, a transmission to a base station associated with the SSB.

2. The method of claim 1, wherein the sequence comprises a PSS related random sequence for extending the PSS.

3. The method of claim 1, wherein the sequence comprises a SSS related random sequence for extending the SSS.

4. The method of claim 1, wherein the sequence comprises a PBCH related sequence for extending the PBCH.

5. The method of claim 1, wherein the set of REs that are unused in the pre-configuration comprise REs that are adjacent to the PSS of the SSB.

6. The method of claim 1, wherein the set of REs that are unused in the pre-configuration comprise physical resource blocks (PRBs) in the SSB containing OFDM symbols and at frequencies unused by the SSB.

7. The method of claim 1, wherein the set of REs, that are unused in the pre-configuration of the SSB, comprise OFDM symbols that are in a slot including the SSB and are unused in the pre-configuration for the SSB.

8. The method of claim 7, wherein the PSS extends into a first subset of the unused OFDM symbols in the slot and wherein the SSS extends into a second subset of the unused OFDM symbols in the slot.

9. The method of claim 7, wherein instances of the SSB are repeated in the unused OFDM symbols in the slot.

10. The method of claim 9, wherein an index associated with each repeated instance of the SSB is different from an originally repeated SSB.

11. The method of claim 9, wherein two different SSBs are repeated.

12. The method of claim 9, wherein a pre-defined random sequence for superimposing on each repeated instance of the SSB is configured, the pre-defined random sequence being known prior to receiving the SSB.

13. The method of claim 1, wherein a subcarrier spacing of the REs is selectable from one of 15 kilohertz (kHz), 30 kHz, 120 kHz, 240 kHz, 480 kHz, or 960 kHz and wherein a periodicity of the SSB is selectable from one of 5 milliseconds, 10 ms, 20 ms, 40 ms, 80 ms, or 160 ms.

14. The method of claim 1, further comprising:
receiving, from the base station, prior to receiving the SSB, an indication of the set of REs used for the sequence and that are unused in the pre-configuration for the SSB.

15. The method of claim 1, wherein the base station comprises a satellite.

16. The method of claim 1, wherein the SSB enables a cell detection performance gain of at least 2.7 dB using at least 108 additional REs, relative to the cell detection performance for the SSB that is not enhanced.

17. The method of claim 1, wherein the sequence comprises a PSS related random sequence for extending the PSS,
wherein the sequence comprises a SSS related random sequence for extending the SSS; and
wherein the sequence comprises a PBCH related sequence for extending the PBCH.

18. The method of claim 1, wherein the SSB is received independent of a user equipment being preconfigured to decode the sequence that extends the PSS, SSS, or the PBCH of the SSB to the set of REs that are unused SSB.

19. An apparatus comprising:
one or more baseband processors configured to:
receive a Synchronization Signal Block (SSB) including a sequence that extends a synchronization signal or a physical broadcast channel (PBCH) of the SSB to a set of REs that are unused in a pre-configuration for transmitting the SSB, the REs being unused in the configuration for transmitting a primary synchronization signal (PSS), a secondary synchronization signal (SSS), or the PBCH, wherein a number of subcarriers for the PSS, SSS, or the PBCH is increased from the pre-configuration to extend the PSS, SSS, or the PBCH; and
send, based on decoding the SSB including the, a transmission to a base station associated with the SSB.

20. Processing circuitry comprising:
one or more processors configured for performing wireless communication by performing operations to:
receive a Synchronization Signal Block (SSB) including a sequence that extends a synchronization signal or a physical broadcast channel (PBCH) of the SSB to a set of REs that are unused in a pre-configuration for transmitting the SSB, the REs being unused in the configuration for transmitting a primary synchronization signal (PSS), a secondary synchronization signal (SSS), or the PBCH, wherein a number of subcarriers for the PSS, SSS, or the PBCH is increased from the pre-configuration to extend the PSS, SSS, or the PBCH; and
send, based on decoding the SSB including the sequence, a transmission to a base station associated with the SSB.

* * * * *